US012760146B2

(12) United States Patent
Mei et al.

(10) Patent No.: US 12,760,146 B2
(45) **Date of Patent: *Oct. 13, 2026**

(54) HIGH TRANSPARENCY ELECTROCHROMIC POLYMERS

(71) Applicant: AMBILIGHT INC., Grand Cayman (KY)

(72) Inventors: Jianguo Mei, West Lafayette, IN (US); Vaidehi Pandit, West Lafayette, IN (US); Zhiyang Wang, West Lafayette, IN (US); Liyan You, West Lafayette, IN (US)

(73) Assignee: Ambilight Inc, Grand Cayman (KY)

( * ) Notice: Subject to any disclaimer, the term of this patent is extended or adjusted under 35 U.S.C. 154(b) by 705 days.

This patent is subject to a terminal disclaimer.

(21) Appl. No.: 18/093,287

(22) Filed: Jan. 4, 2023

(65) Prior Publication Data

US 2023/0250223 A1 Aug. 10, 2023

Related U.S. Application Data

(63) Continuation-in-part of application No. 17/748,383, filed on May 19, 2022, which is a continuation-in-part of application No. 17/668,300, filed on Feb. 9, 2022.

(51) Int. Cl.
*C08G 61/12* (2006.01)

(52) U.S. Cl.
CPC ......... *C08G 61/126* (2013.01); *C08G 61/124* (2013.01); *C08G 2261/124* (2013.01);
(Continued)

(58) Field of Classification Search
CPC ... G02F 1/15165; G02F 1/155; C08G 61/124; C08G 61/126; C08G 2261/122;
(Continued)

(56) References Cited

U.S. PATENT DOCUMENTS

| | | | |
|---|---|---|---|
| 10,955,717 | B1 | 3/2021 | Chen et al. |
| 2007/0008603 | A1 | 1/2007 | Sotzing et al. |

(Continued)

FOREIGN PATENT DOCUMENTS

| | | | |
|---|---|---|---|
| CN | 103483391 | A | 1/2014 |
| CN | 112126043 | A | 12/2020 |

(Continued)

OTHER PUBLICATIONS

Zheng, et al. "A novel self-healing electrochromic film based on a triphenylamine cross-linked polymer." Polymer Chemistry 8.45 (2017): 6981-6988.

(Continued)

*Primary Examiner* — Shane Fang
(74) *Attorney, Agent, or Firm* — Dickinson Wright PLLC

(57) ABSTRACT

An electrochromic polymer is comprised of a repeat unit comprising one or more meta-conjugated linkers (MCLs) and one or more aromatic moieties (Ars). Each of the one or more MCLs is partially conjugated with the one or more Ars at meta positions of the MCLs to form a polymer backbone of the electrochromic polymer. The electrochromic polymer undergoes an optical switching and a color change in an electrochromic device, which shows a high transparency and a high optical contrast.

15 Claims, 4 Drawing Sheets

(52) U.S. Cl.
CPC ................ *C08G 2261/1424* (2013.01); *C08G 2261/3223* (2013.01); *C08G 2261/3241* (2013.01); *C08G 2261/54* (2013.01)

(58) Field of Classification Search
CPC .... C08G 2261/1412; C08G 2261/1424; C08G 2261/312; C08G 2261/3223; C08G 2261/3241; C08G 2261/411; C08G 2261/1416; C09K 9/02; C09K 2211/1425; C09K 2211/1458; C09K 2211/1475
See application file for complete search history.

(56) References Cited

U.S. PATENT DOCUMENTS

| | | | |
|---|---|---|---|
| 2007/0191576 A1 | 8/2007 | Sotzing | |
| 2008/0100213 A1 | 5/2008 | Wakuma et al. | |
| 2011/0288253 A1 | 11/2011 | Reynolds et al. | |
| 2012/0108778 A1 | 5/2012 | Amb et al. | |
| 2019/0016852 A1 | 1/2019 | Mei et al. | |
| 2020/0387040 A1 | 12/2020 | He et al. | |
| 2022/0017689 A1 | 1/2022 | You et al. | |
| 2023/0251541 A1* | 8/2023 | Mei | G02F 1/15165 528/211 |

FOREIGN PATENT DOCUMENTS

| | | |
|---|---|---|
| KR | 20190037062 A | 4/2019 |
| WO | 2021/242267 A1 | 12/2021 |

OTHER PUBLICATIONS

Li, et al. "Structural effects of dibromocarbazoles on direct arylation polycondensation with 3, 4-ethylenedioxythiophene." Polymer Chemistry 7. 18 (2016): 3165-3171.
Yu, et al. "Preparation and characterization of a class of self-doping aromatic polyoxadiazole electrochromic materials." journal of Applied Polymer Science 137. 45 (2020): 49406.
Gaupp et al., Multichromic Copolymers Based on 3,6-Bis(2-(3,4-ethylenedioxythiophene))-N-alkylcarbazole Derivatives, Macromolecules, vol. 36, No. 17, Jul. 22, 2003 [retrieved on Jun. 23, 2022] Retrieved from the Internet: <URL: https://pubs.acs.org/doi/pdf/10.1021/ma034493e>. pp. 6305-6315.
Written Opinion of the International Searching Authority and International Search Report for PCT Application No. PCT/US2022/016609 mailed on Aug. 1, 2022 (14 pages).
Written Opinion of the International Searching Authority and International Search Report for PCT Application No. PCT/US22/30049 mailed on Oct. 13, 2022 (13 pages).
Non-Final Office Action for U.S. Appl. No. 17/748,383 mailed on Sep. 29, 2022 (26 pages).
Aubert, et al. "Copolymers of 3, 4-ethylenedioxythiophene and of pyridine alternated with fluorene or phenylene units: Synthesis, optical properties, and devices." marcomolecules 37. 11 (2004): 4087-4098.
Stalder, et al. "n-Type conjugated polyisoindigos." Macromolecules 44. 16 (2011): 6303-6310.
Zhang, et al. "Colorless-to-colorful switching electrochromic polyimides with very high contrast ratio." Nature communications 10.1 (2019): 1-8.
Final Office Action for U.S. Appl. No. 17/748,383 mailed on Jan. 12, 2023 (26 pages).
Final Office Action for U.S. Appl. No. 17/668,300 mailed on Jan. 13, 2023 (24 pages).
Hsiao Sheng-Huei et al: "Fluorescent and electrochromic polymers from 2,8-di(carbazol-9-yl)dibenzothiophene and its S,S-dioxide derivative", Dyes and Pigments, vol. 134, Jun. 29, 2016 (Jun. 29, 2016), pp. 51-63.
Jeong Dong-Cheol et al: "Effects of Substituent on Binaphthyl Hinge•Containing Conductive Polymers", Macromolecules, vol. 45, No. 24, Dec. 10, 2012 (Dec. 10, 2012), pp. 9571-9578.
Liu Jian et al: "Electrochromic polymer achieving synchronous electrofluorochromic switching for optoelectronic application", Organic Electronics, vol. 51, Sep. 18, 2017 (Sep. 18, 2017), pp. 295-303.
Kocaeren Aysel Aydin: "Synthesis and electrochromic performance of a novel polymer based on an oxidative polymer derived from carbazole and thiophene", Journal of Polymer Research, vol. 23, No. 4, Mar. 8, 2016 (Mar. 8, 2016), pp. 1-10.
Merve İçli-Özkut et al.: "Substituent and heteroatom effects on the electrochromic properties of similar systems", Journal of Polymer Science Part A: Polymer Chemistry, vol. 50, No. 4, Oct. 28, 2011 (2011-10-28), pp. 615-621.
Non-Final Office Action and List of References mailed for U.S. Appl. No. 18/892,065 on Jan. 28, 2025, 9 pages.
Non-Final Office Action and List of References mailed for U.S. Appl. No. 18/892,033 on Jan. 28, 2025, 8 pages.
Zhang, Yaxin et al., "Soluble high coloration efficiency electrochromic polymers based on (N-phenyl)carbazole, triphenylamine and 9,9-dioctyl-9H-fluorene," Synthetic Metals 247 (2019) 81-89, Elsevier, Synthetic Metals, 9 pages.
Yu, Yuanyuan et al., "Preparation and characterization of a class of self-doping aromatic polyoxadiazole electrochromic materials," Journal of Applied Polymer Science, 2020;137:e49406, 8 pages.

* cited by examiner

HIGH TRANSPARENCY ELECTROCHROMIC POLYMERS

CROSS-REFERENCE TO RELATED APPLICATIONS

This application is a Continuation-In-Part application of Non-Provisional application Ser. No. 17/748,383, filed on May 19, 2022, which is a Continuation-In-Part application of Non-Provisional application Ser. No. 17/668,300, filed on Feb. 9, 2022. The entire contents of all of the above applications are incorporated herein by reference in their entirety.

TECHNICAL FIELD

The present disclosure is related to a new type of electrochromic polymers that comprise meta-conjugated linkers and aromatic moieties, which present a high transparency in the visible light region in the neutral state. The polymers become highly absorbing in the visible light and near-infrared region and thus colored when their films are being oxidized. A device incorporating such conjugated electrochromic polymer films with a high optical contrast and a high transmittance is also disclosed.

BACKGROUND

Electrochromic devices allow to adjust light transmittance and control solar-heat gain. In comparison with inorganic-based electrochromic devices made through the vacuum sputtering process, polymer-based electrochromic windows can be manufactured through roll-to-roll coating and lamination. It thus renders a low-cost production and manufacturing flexibility. Polymer based electrochromic devices are typically composed of conjugated electrochromic polymers (ECPs), which feature fully conjugated polymer backbone made of $sp^2$ hybridized carbons. Conventionally, ECPs typically have strong absorbance in the visible light region and are thus colored in their neutral state. When they are oxidized, their absorption is shifted toward near-infrared (near-IR) region and they become transmissive in the visible light region. However, the oxidized polymers still have weak absorption in the visible light region, leading to residue colors. The problem becomes more severe when the polymer films are thick. As a result, it negatively impacts optical contrast of the polymers. Furthermore, it limits the highest optical transmittance a conjugated electrochromic polymer can achieve. In addition, conventional ECPs in the neutral state blocks visible light through the film and allow near-IR light passing through; While in the transmissive state, it allows visible light passing through and blocks near-IR light. This combination is not effective for thermal management and control the solar-heat gain (SHG). SHG describes the way radiation from the sun is turned into heat through a window product.

SUMMARY

The present disclosure is related to a new type of electrochromic polymer. The electrochromic polymer disclosed in this application consists of a polymer backbone comprising one or more meta-conjugated linkers (MCLs) and one or more aromatic moieties (Ars). Each of the one or more MCLs is partially conjugated with the one or more Ars at meta positions of the one or more MCLs to form the polymer backbone of an electrochromic polymer. In some embodiments, the disclosed electrochromic polymer is anodically-coloring electrochromic polymer (AC-ECP), becoming colored when it is oxidized.

In some embodiments, the disclosed electrochromic polymer has an energy bandgap equal to or higher than 2.9 eV and less than 4.0 eV in the neutral state. In some embodiments, the absorption maxima ($\lambda_{max}$, the wavelength at which the polymer has its strongest photon absorption) are less than 410 nm in the neutral state. In some embodiments, the disclosed electrochromic polymer is colorless in the neutral state, while it is colored and visible and near-infrared absorbing in the oxidized state. The oxidized electrochromic polymer has an absorption coefficient larger than $10^4$ $cm^{-1}$ in the visible and/or near-IR region and thus colored in the oxidized state.

In spite of their high bandgaps, the disclosed electrochromic polymers still have relatively low oxidation potential in the ranges of 0.1-1.5 V inclusive versus Ag/AgCl electrode in some embodiments.

The MCL comprises at least one of an aromatic structure, or a fused aromatic structure, or the combinations thereof. The aromatic structure comprises a benzene or heterocyclic structure. The fused aromatic structure comprises a fused benzene structure or a fused heterocyclic structures or a fused benzene and heterocyclic structure.

In some embodiments, for the disclosed electrochromic polymers, the one or more MCLs and the one or more Ars are arranged in an alternative or random fashion with a general formula of $$-\!\!\left[MCL_1-Ar_1\right]_{m_1}\!\!\left[MCL_2-Ar_2\right]_{m_2}\!\!- \cdots -\!\!\left[MCL_n-Ar_n\right]_{m_n}\!\!- .$$

In the structures here, n is an integer greater than 0 and each of $m_1, m_2, \ldots, m_n$ is an integer equal to or greater than 0 with at least one of $m_1, m_2, \ldots, m_n$ is greater than 0. The one or more MCLs (or the one or more Ars) can be the same as or different from each other.

In some embodiments, the one or more MCLs and corresponding meta-positions comprise one of the following formulas:

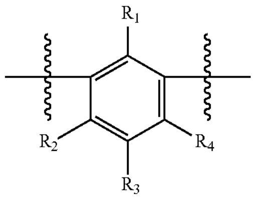

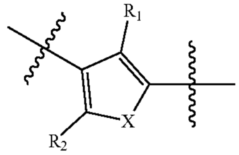

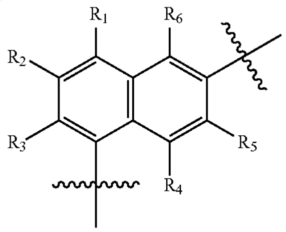

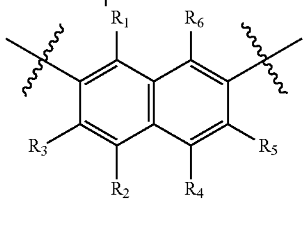

-continued
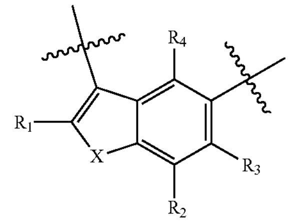
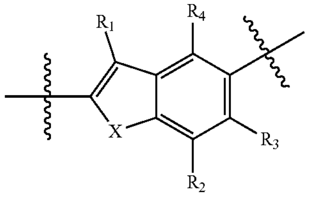
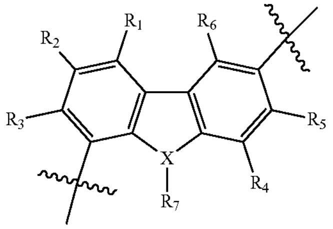
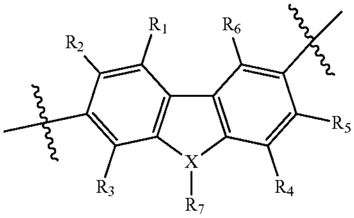
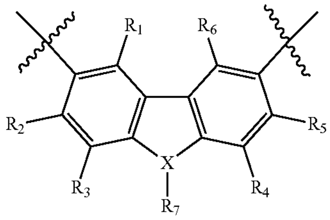
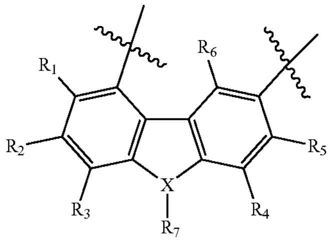
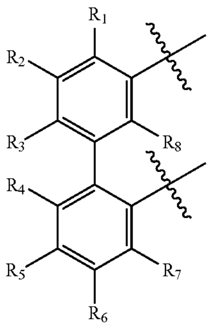
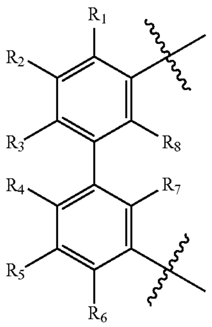
-continued
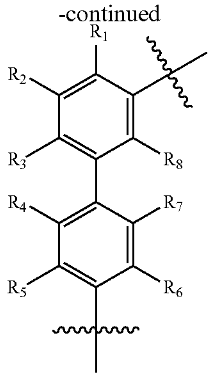
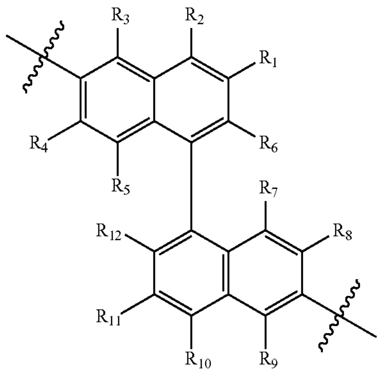
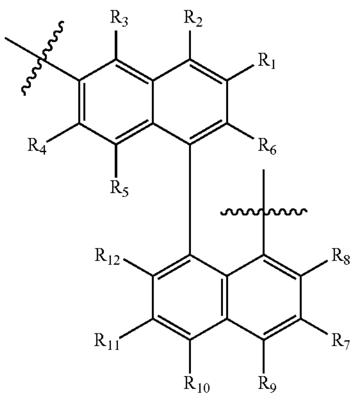
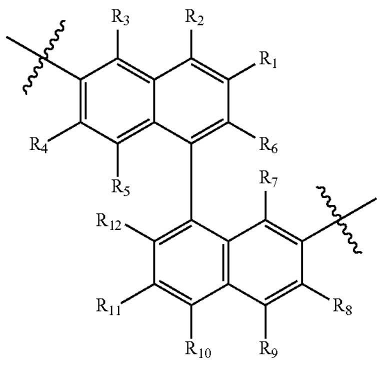

-continued
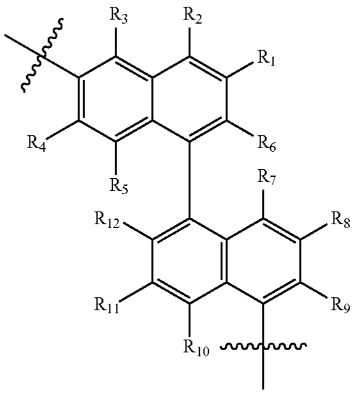
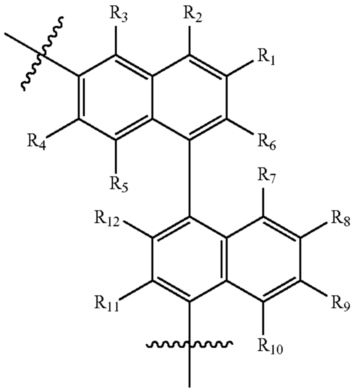
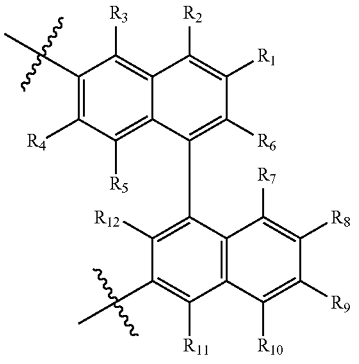
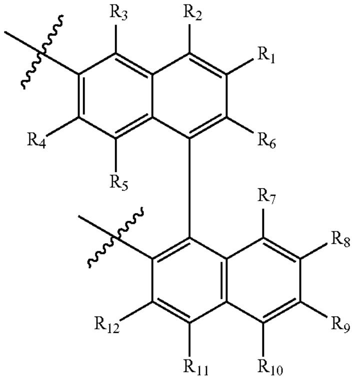
-continued
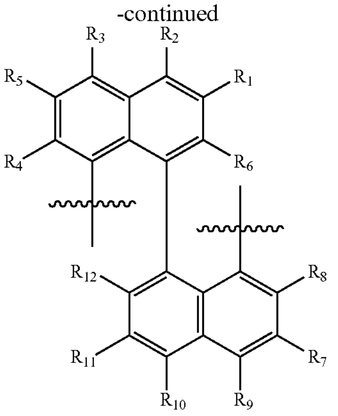
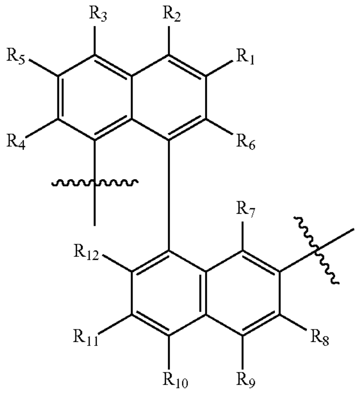
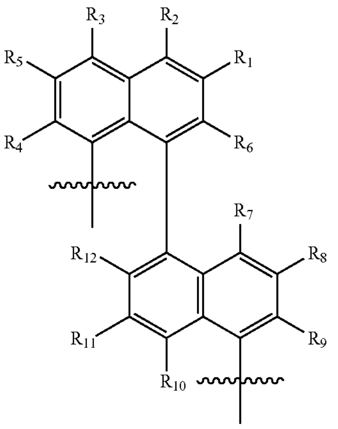
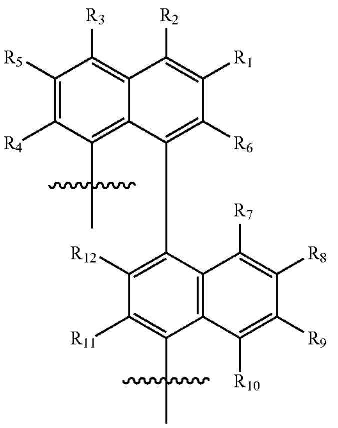

-continued
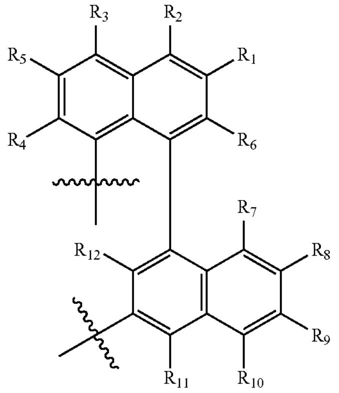
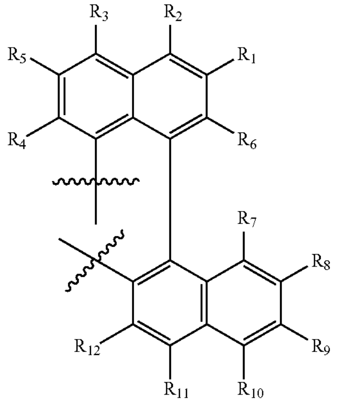
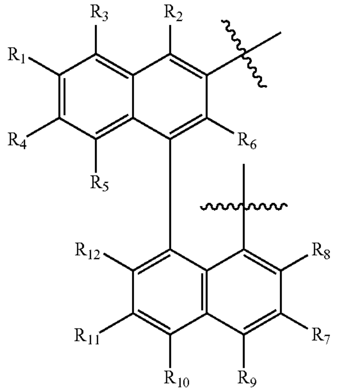
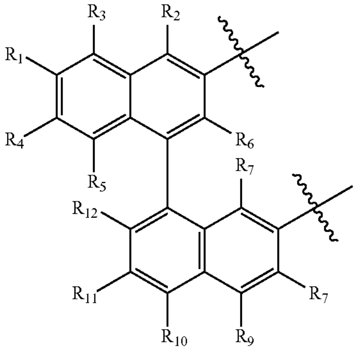
-continued
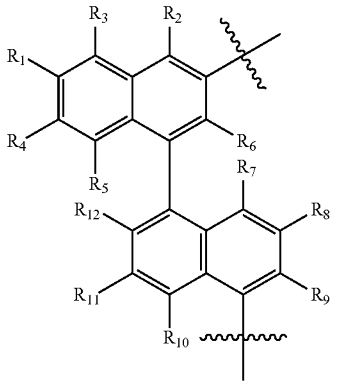
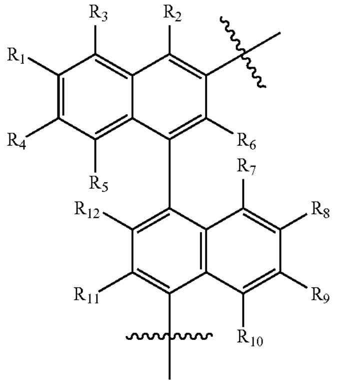
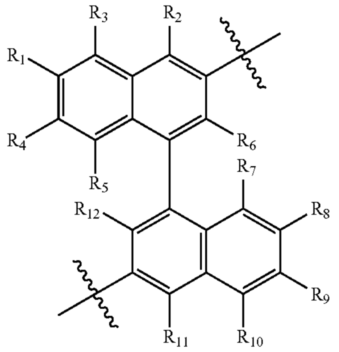
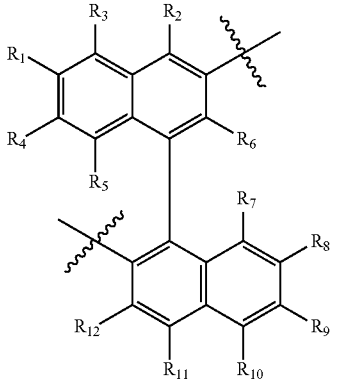

-continued
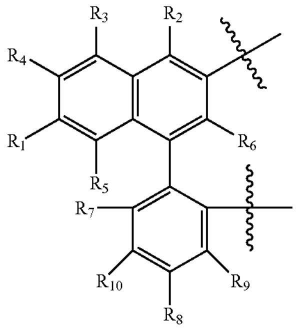
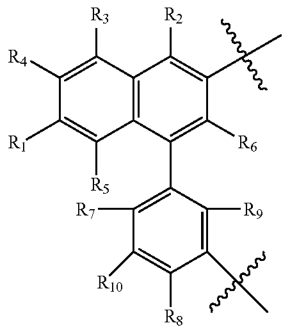
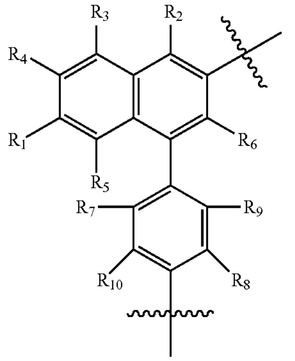
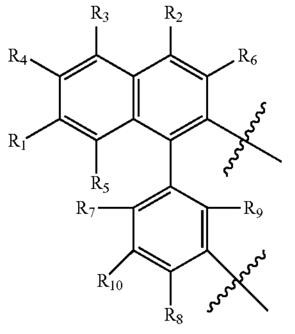
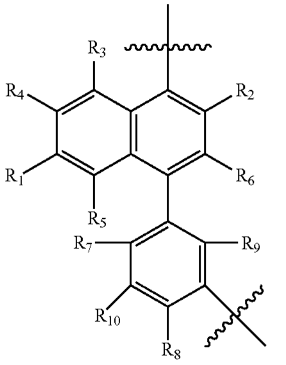
-continued
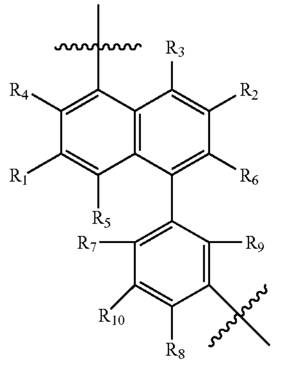
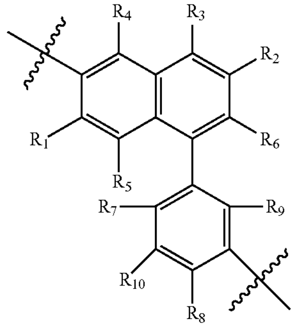
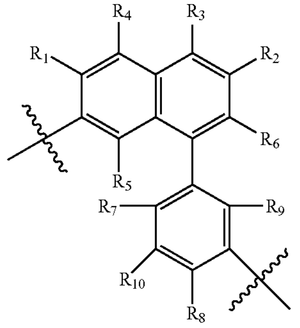
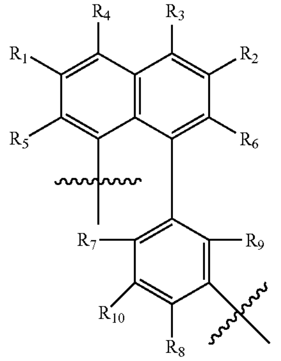
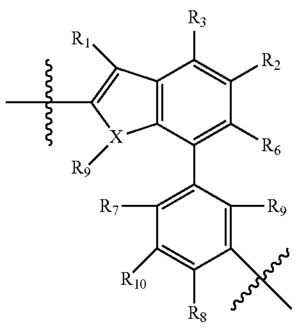

-continued
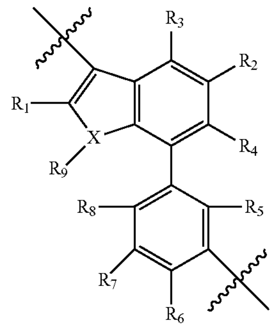
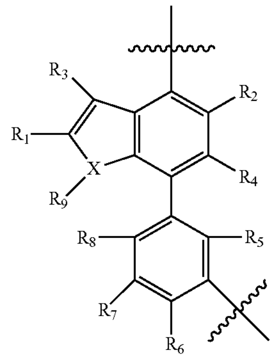
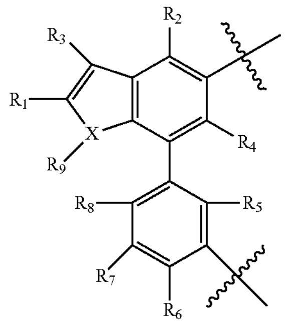
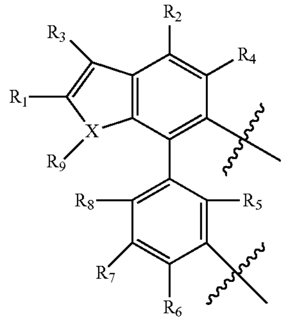
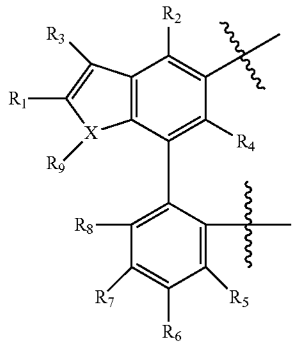
-continued
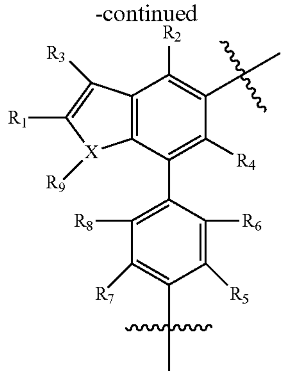
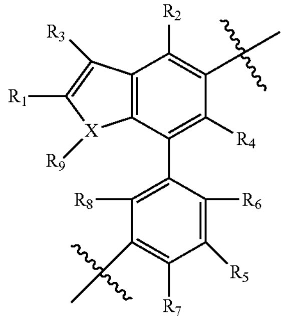
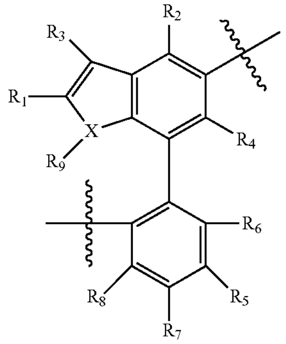
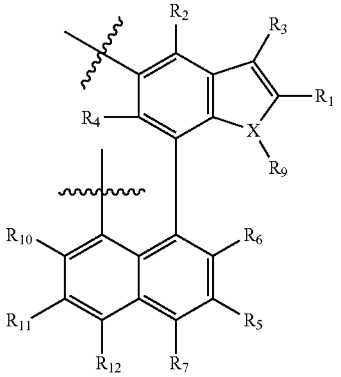
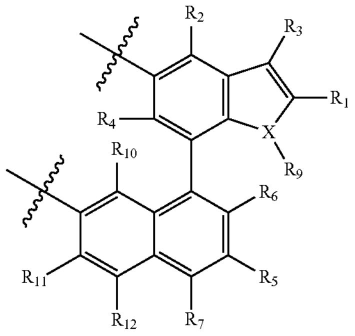

-continued
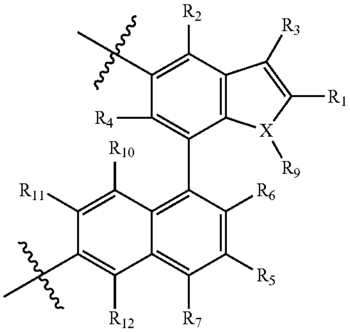
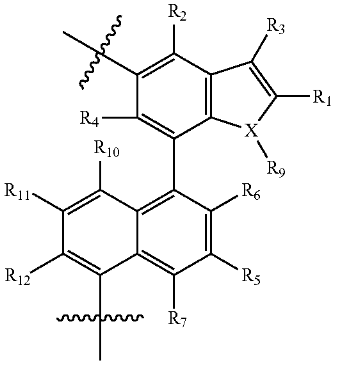
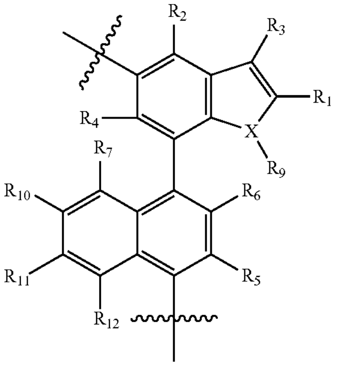
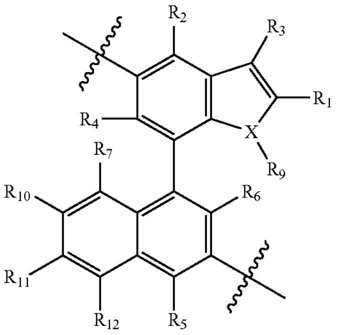
-continued
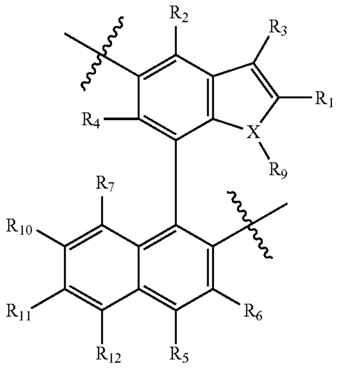
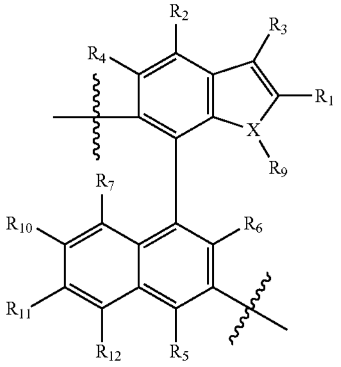
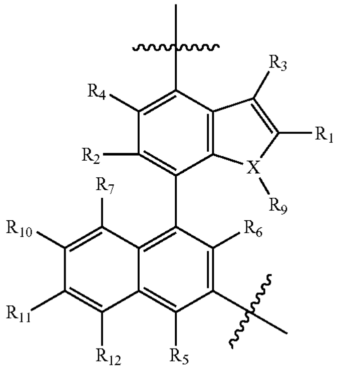
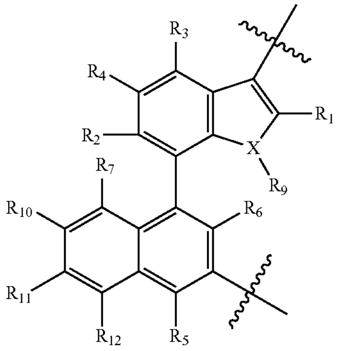

-continued

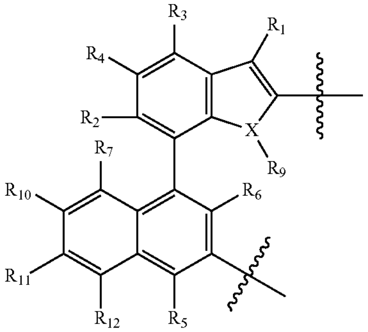

wherein each of the wavy lines represents meta-positions to link adjacent the one or more Ars; X is S, Se, N, C, or O; $R_1$-$R_{12}$ is independently selected from the following substituents, including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkyl sulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl.

In some embodiments, the one or more Ars comprise one of a thiophene-based unit, a furan-based unit, a selenophene-based unit, or a pyrrole-based unit with a formula of

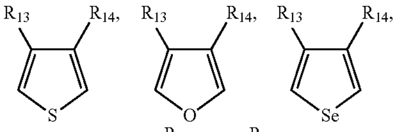

and

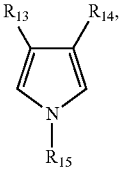

or any combination thereof, wherein each of $R_{13}$, $R_{14}$ and $R_{15}$ is independently selected from the following substituents, including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkyl sulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl.

In some embodiments, the thiophene-based unit comprises a formula of

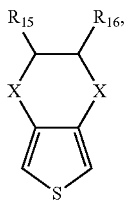

or

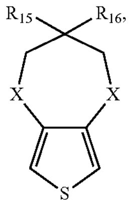

or

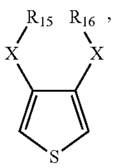

or

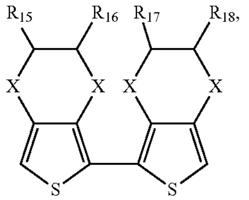

or

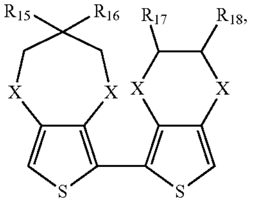

or

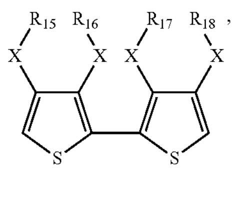

or

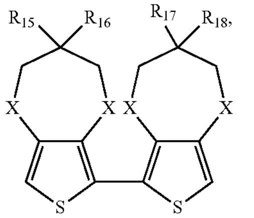

or

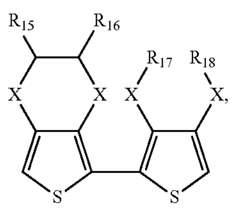

or

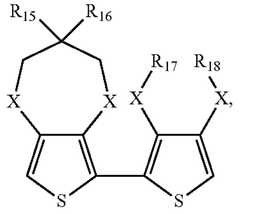

or

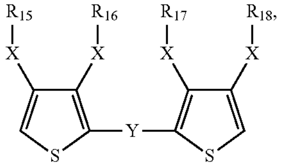

or

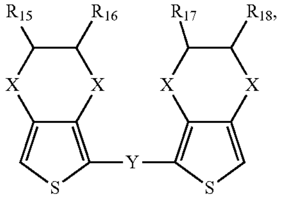

or

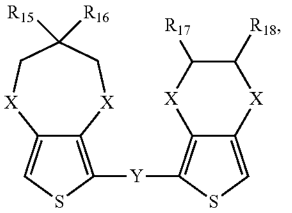

or

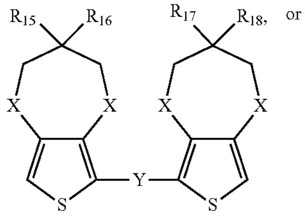

or

-continued

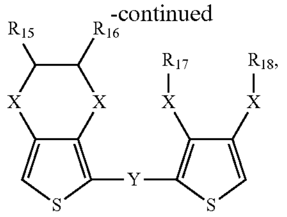

or

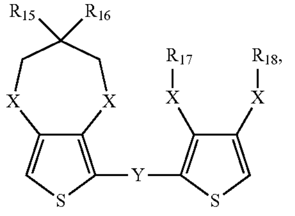

or a combination thereof, wherein X is S, Se, N, C, or O; each of $R_{15}$-$R_{18}$ is independently selected from the following substituents, including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl. Y is any one or more of Ars, or aromatic structures, or fused aromatic structures, or a combinations thereof.

In some embodiments, X in the thiophene-based unit is O.

In some embodiments, the disclosed electrochromic polymers comprise a formula of

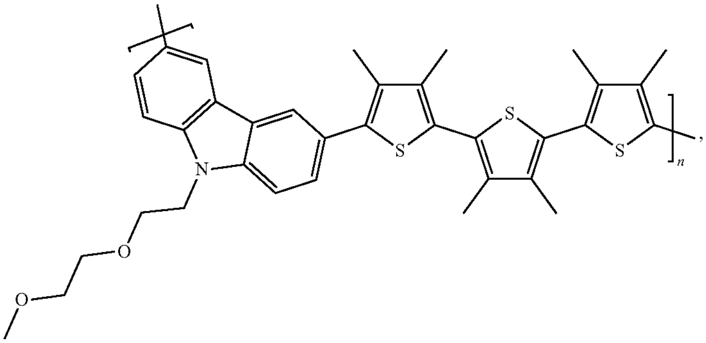

or

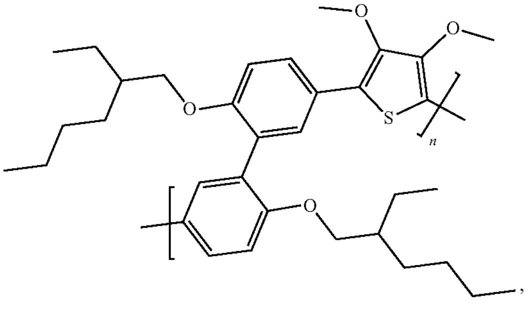

or

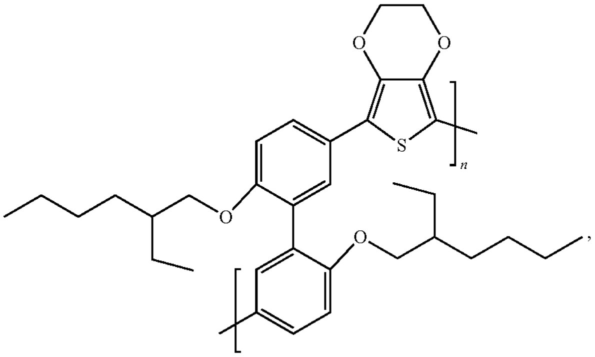

or

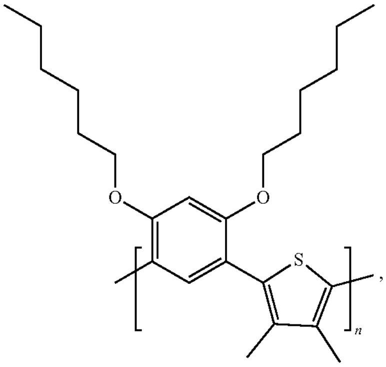

or

-continued
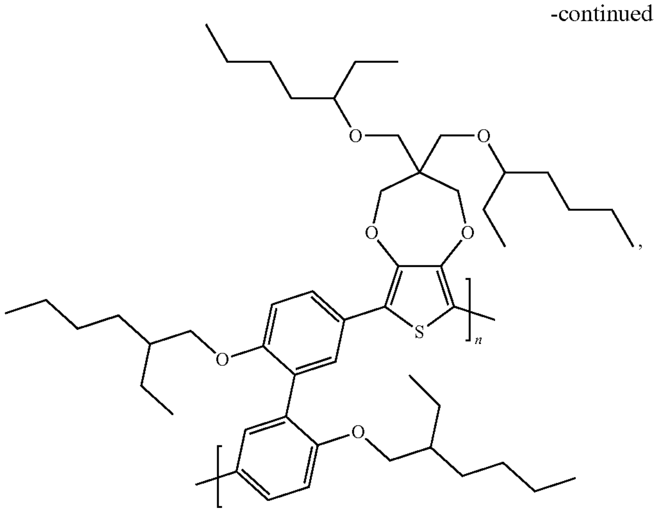
, or
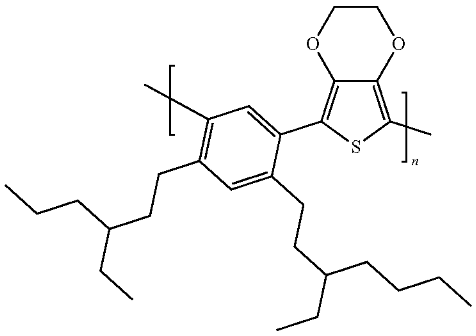
, or
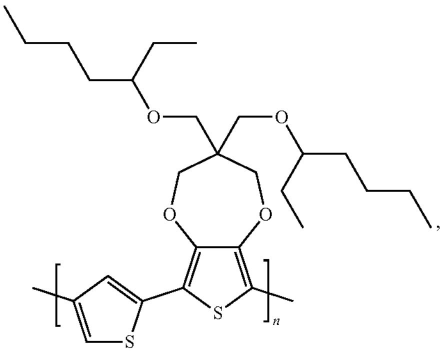
, or
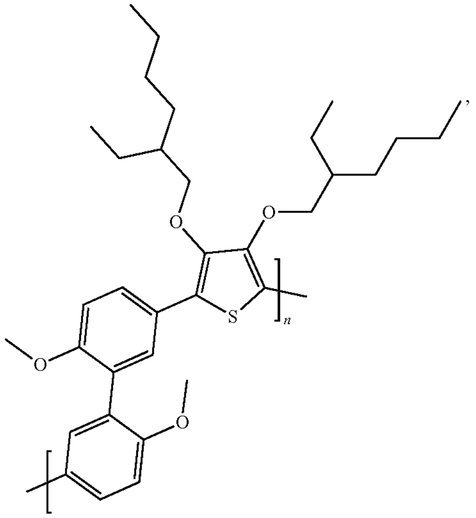
, or
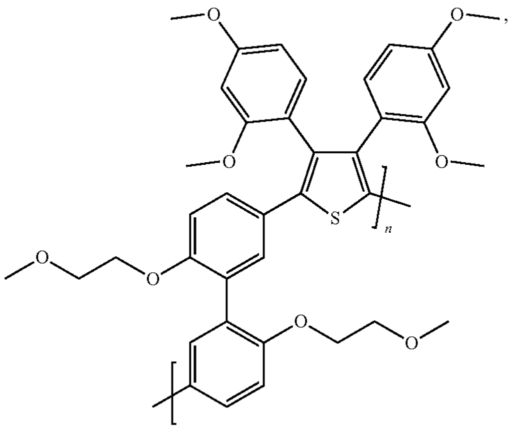
, or
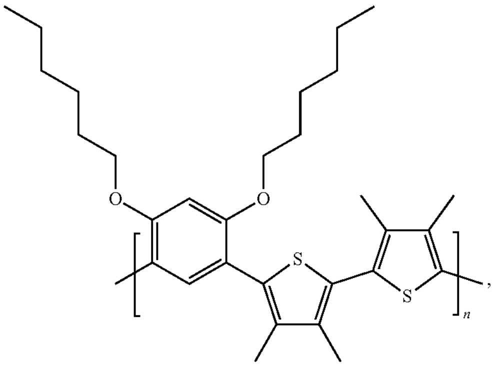
, or -continued
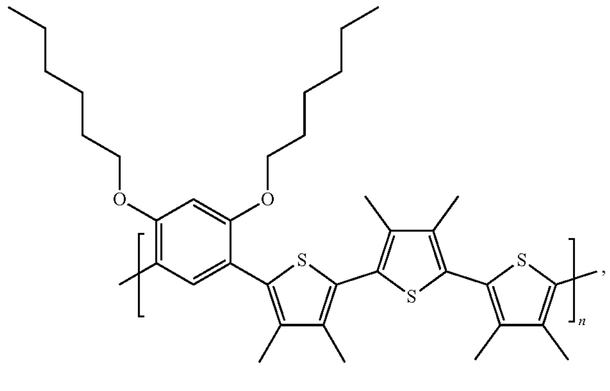
, or
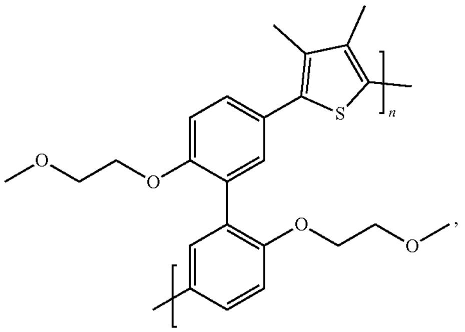
, or
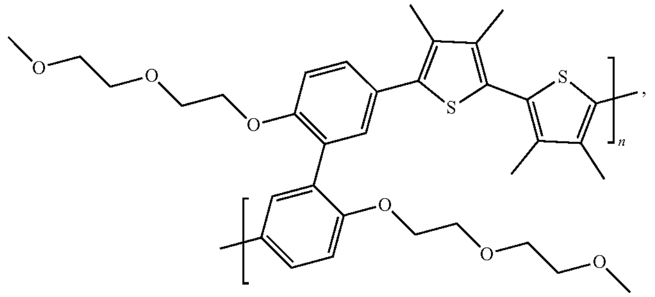
, or
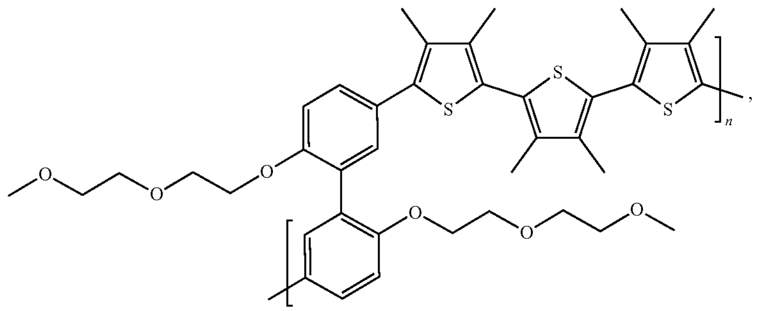
, or
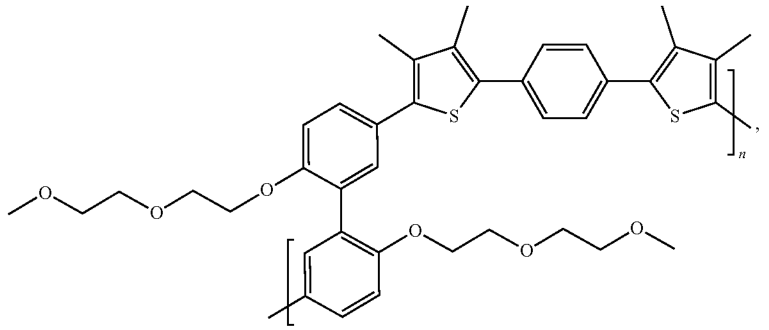
, or
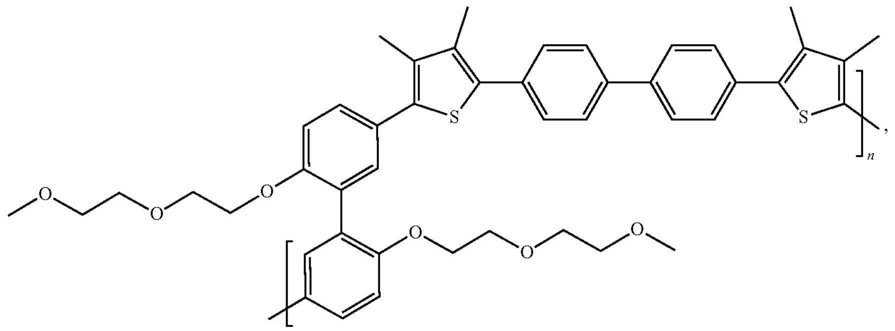
, or -continued
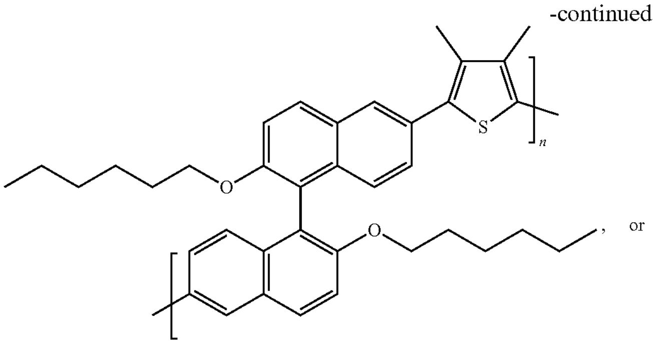
, or
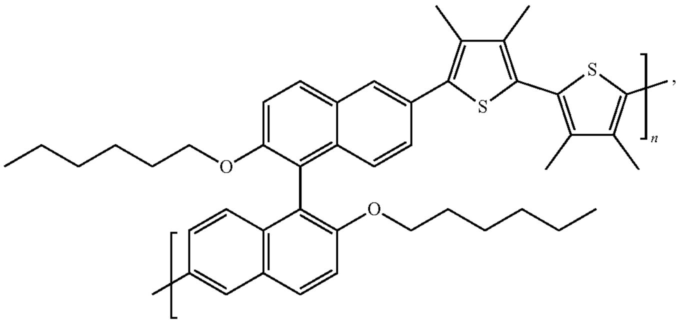
, or
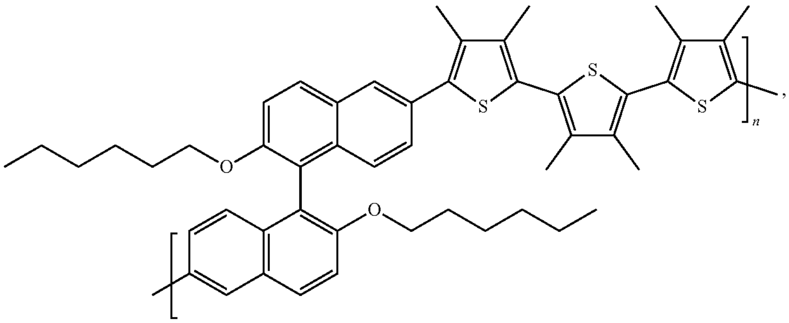
, or
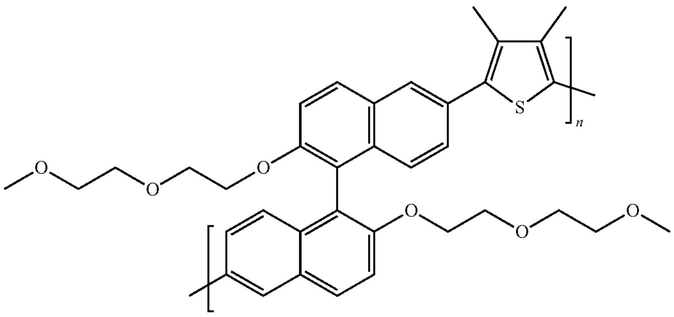
or
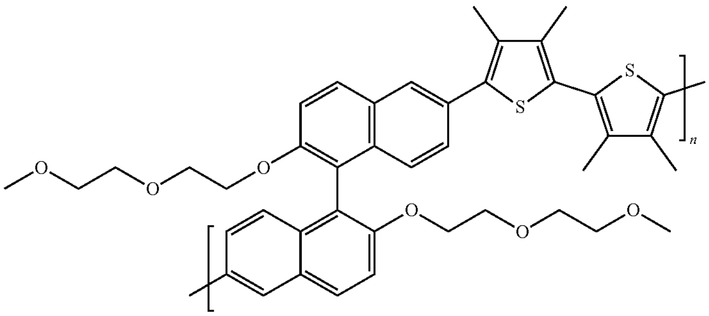
or -continued
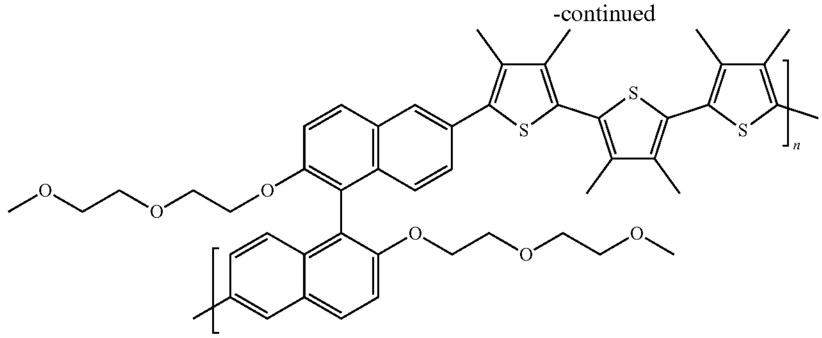
or
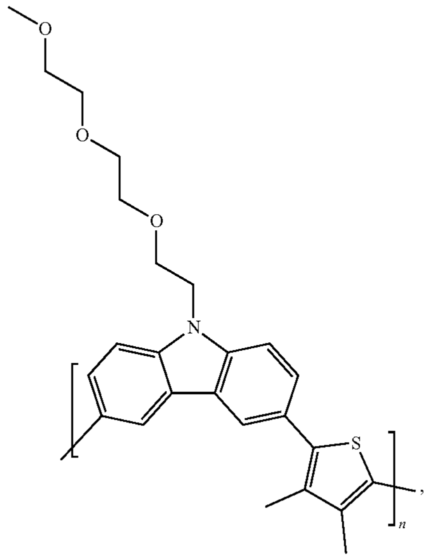
, or
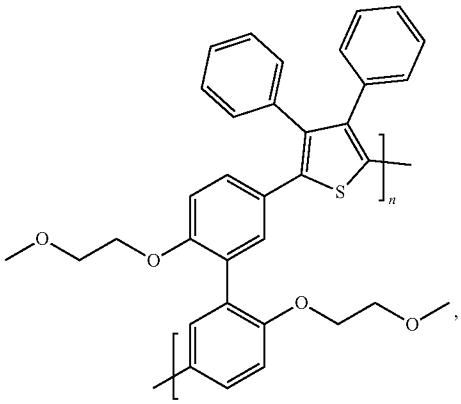
, or
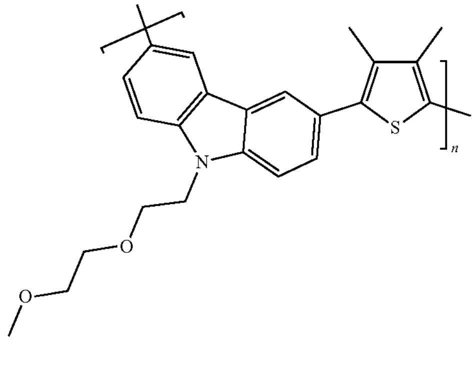
or
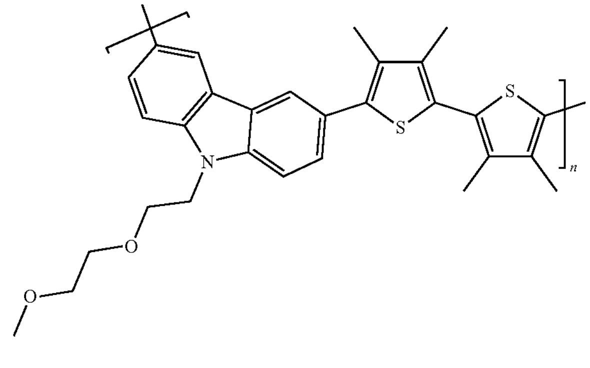
or -continued

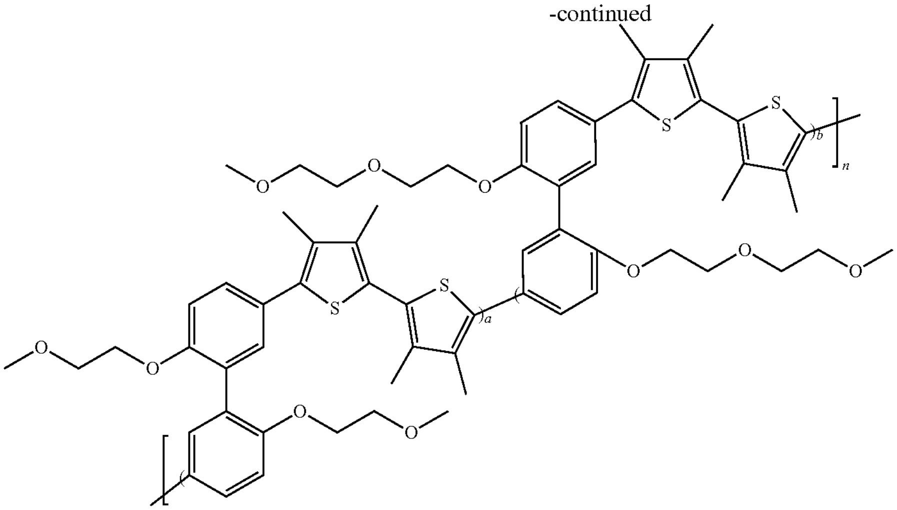

wherein n, and m are integers greater than 0, a and b are integers equal to or greater than 0 with at least one of a and b is greater than 0.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings.

DETAILED DESCRIPTION OF EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it was individually recited herein. Additionally, the singular forms "a" "an", and "the" include plural referents unless the context clearly dictates otherwise.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment, but maybe in some instances. Furthermore, the particular features, structures, or characteristics may be combined in any suitable manner in one or more embodiments.

The present disclosure is related to a new type of electrochromic polymers. The electrochromic polymer disclosed in this application consists of a polymer backbone comprising one or more meta-conjugated linkers (MCLs) and one or more aromatic moieties (Ars). Each of the one or more MCLs is partially conjugated with the one or more Ars at meta positions of the one or more MCLs to form the polymer backbone of an electrochromic polymer. In some embodiments, the electrochromic polymer disclosed in this application consists of a repeat unit comprising one or more MCLs and one or more Ars, where meta-conjugation is introduced along the polymer backbone through the use of the MCLs. In some embodiments, the electrochromic polymer is anodically-coloring electrochromic polymer (AC-ECP), becoming colored when it is oxidized.

Figure 1A:
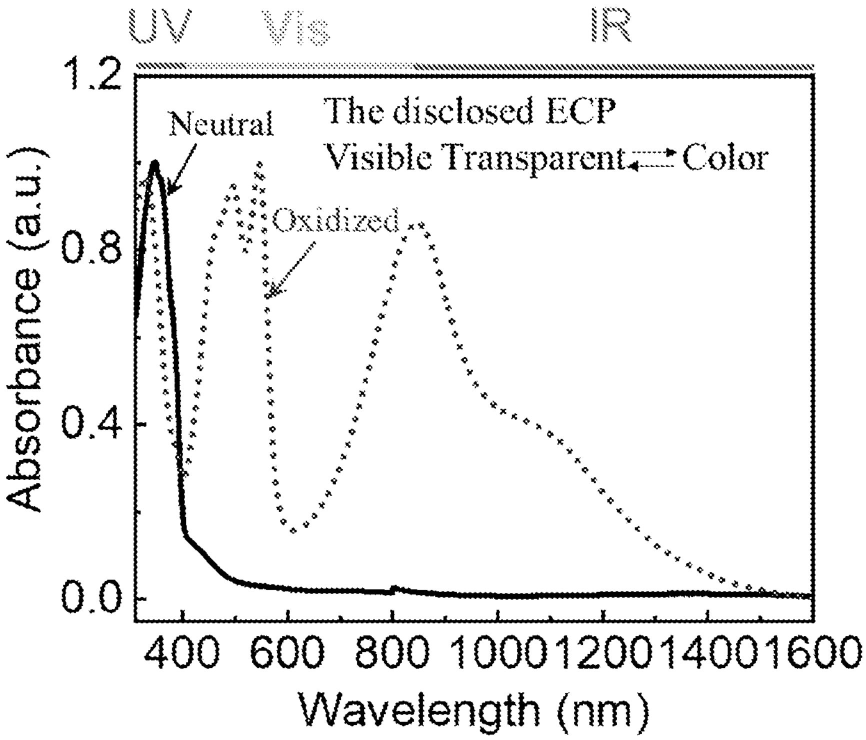
FIGS. 1(A)-(B) are diagrams representing the different color changing mechanisms of the disclosed ECP (FIG. 1(A)) compared to conventional ECP (FIG. 1(B)).
Figure 1B:
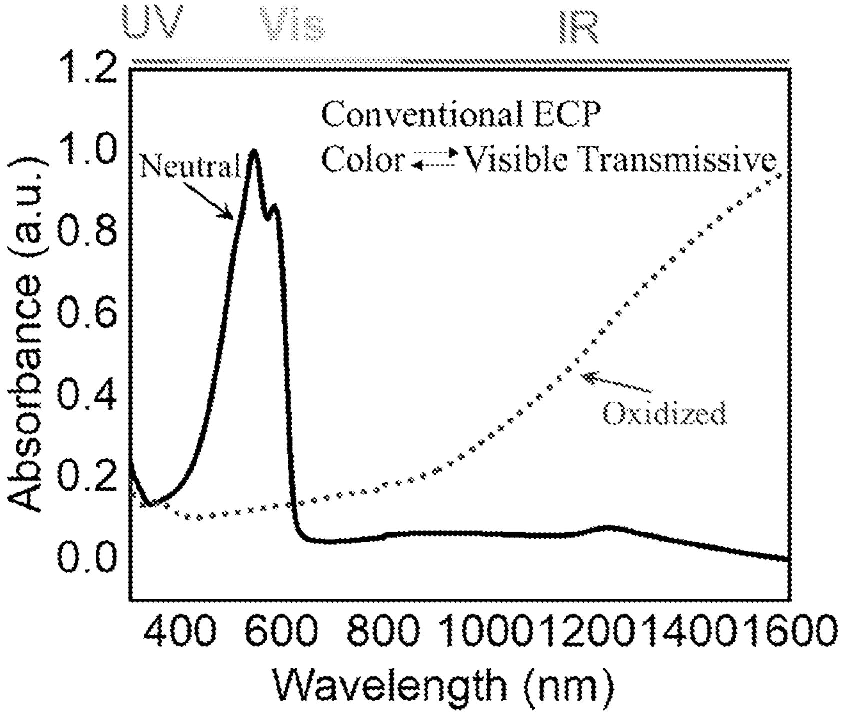

As illustrated in FIG. 1, conventional conjugated ECPs (FIG. 1(B)) are fully conjugated and have strong absorbance in the visible light region and are thus colored in their neutral state, while when oxidized (oxidized state), their absorption is shifted toward near-IR region and they become transmissive. However, the oxidized polymers still have weak absorption in the visible light region, leading to residue colors. On the other hand, as illustrated for one example disclosed ECP in FIG. 1(A), the ECP exhibits substantially no absorption after 450 nm in the neutral state and has several absorption peaks in visible light range and the near infrared range in the oxidized state, demonstrating coloring in the visible light range and near-infrared absorbing.

The disclosed electrochromic polymers allows passing or blocking of visible light and near-IR light to be synchronized, which is in one embodiment very useful in an electrochromic window for the management of solar heat gain. The disclosed electrochromic polymers are transparent in the neutral state, and are colored and IR-absorbing in the oxidized state, which are highly desired in order to achieve a high optical contrast, a high transmittance and a synergistic solar-heat gain.

The disclosed electrochromic polymers are transparent in the visible light region in the neutral state and are colored in the oxidized state. For example, the disclosed electrochromic polymers may have a transmittance of at least 60% in the visible light range (e.g., 450-750 nm) in the neutral state. In some embodiments, the disclosed electrochromic polymers may have a transmittance of at least 65%, 70%, 75%, 80%, 85%, 90%, 92%, 95%, 98%, or above in the range of 450-750 nm in the neutral state. In some embodiments, the disclosed electrochromic polymers are transparent in the visible light range in the neutral state. In the oxidized state, the disclosed electrochromic polymers have absorption in the visible light range (e.g., about 360 to 750 nm) and the near-IR range (e.g., about 750 to 1600 nanometers), thereby being colored and near-infrared absorbing.

The disclosed electrochromic polymer has UV absorption and energy bandgap. An energy bandgap is the energy difference between the valence band of electrons and the conduction band. It is the minimum change in energy required to excite an electron up to a state in the conduction band where it can participate in conduction. Absorption onset ($\lambda_c$) is the wavelength at higher than which the polymer has no photon absorption. The energy bandgap can be calculated as 1240/wavelength of absorption onset. In some embodiments, the electrochromic polymers disclosed in this application have an absorption onset at equal to or less than 450 nm in the neutral state. In some embodiments, the disclosed electrochromic polymer has an absorption onset at equal to or less than 440 nm, 430 nm, 420 nm, 410 nm, 405 nm, or 400 nm in the neutral state. In some embodiments, the absorption maxima ($\lambda_{max}$, the wavelength at which the polymer has its strongest photon absorption) are less than 420 nm in the neutral state. In some embodiments, the absorption maxima are less than 410 nm or 405 nm or 400 nm in the neutral state. In some embodiments, the disclosed electrochromic polymer has an energy bandgap equal to or higher than 2.8 eV and less than 4.0 eV in the neutral state. In some embodiments, the disclosed electrochromic polymer has an energy bandgap equal to or higher than 2.9, 3.0 or 3.1 eV and less than 4.0 eV in the neutral state. In some embodiments, the disclosed electrochromic polymer is colorless (e.g., no absorbance in 400-750 nm or 410-750 nm or 420-750 nm) or yellow (e.g., tailing absorption in 400-500 nm, or 410-500 nm, or 420-500 nm or 400-480 nm, or 410-480 nm, or 420-480 nm or 400-450 nm, or 410-450 nm or 420-450 nm) in the neutral state and is colored and visible and near-IR absorbing in the oxidized state. The oxidized electrochromic polymer has an absorption coefficient larger than $10^4$ $cm^{-1}$ in the visible and/or near-IR region and thus colored in the oxidized state.

Due to substantial lack of absorbance in the visible light range in the neutral state and high absorbance in the visible light range in the oxidized state, the disclosed electrochromic polymers demonstrate high optical contrast and high optical transmittance when comparing with conventional ECPs. In spite of their high bandgaps, the disclosed electrochromic polymers have relatively low oxidation potential in the ranges of 0.1-1.5 V inclusive versus Ag/AgCl electrode in some embodiments. In some embodiments, the disclosed electrochromic polymers have low oxidation potential in the ranges of 0.1-1 V inclusive versus Ag/AgCl electrode. The relatively low oxidation potential can benefit cycling durability of ECPs. Thus, the disclosed electrochromic polymers can be successfully incorporated into a device with a good cycling stability/reliability and a high optical contrast.

The MCL comprises at least one of an aromatic structure, or a fused aromatic structure, or the combinations thereof. The aromatic structure comprises a benzene or heterocyclic structure. The fused aromatic structure comprises a fused benzene structure or a fused heterocyclic structures or a fused benzene and heterocyclic structure. In some embodiments, the MCL comprises at least one of benzene, or naphthalene, or five-membered heterocycle, or benzene fused five-membered heterocycle, or a combination of these structures. Side chains or aromatic side chains can also be introduced onto the MCL to adjust its performance, for example, solubility or processibility or stability.

In some embodiments, the one or more MCLs and the one or more Ars are arranged in an alternative or random fashion with a general formula of $$-\!\left[MCL_1-Ar_1\right]_{m_1}\!\left[MCL_2-Ar_2\right]_{m_2} \cdots -\!\left[MCL_n-Ar_n\right]_{m_n}.$$

In the structure here, n is an integer higher than 0 and each of $m_1, m_2, \ldots, m_n$ is an integer equal to or higher than 0 with at least one of $m_1, m_2, \ldots, m_n$ is higher than 0. The one or more Ars are aromatic moieties, which may include one or more aromatic structures. Each of the one or more MCLs (or Ars) can be the same as or different from each other.

Meta-conjugation is introduced in the polymer backbone through the use of the one or more MCLs. Each of the one or more MCLs is partially conjugated in the polymer backbone by connecting with the one or more Ars through its meta-positions. For example, the meta-positions are two positions of the aromatic structure or a fused aromatic structure of the MCLs. When the meta-positions are connected, the pi electrons from an aromatic structure or a fused aromatic structure cannot be fully delocalized to another adjacently-connected unit through p-orbitals.

In some embodiments, an aromatic structure of the MCLs comprises a benzene structure or a five-membered heterocyclic structure, and the aromatic structure of the MCLs is substituted at meta-positions, which are the 1- and 3-positions on the aromatic structure. In some embodiments, a fused aromatic structure of the MCLs comprises naphthalene, and the fused aromatic structure is substituted at meta-positions, which are the 1- and 3-, or 1- and 4-, or 1- and 6-positions on naphthalene. In some embodiments, a fused aromatic structure of the MCLs comprises benzene fused with a five-membered heterocycle, and the fused aromatic structure is substituted at meta-positions, which are the 1- and 3-, or 1- and 5-positions on the benzene fused heterocycle.

Example structures of the one or more MCLs and corresponding meta-positions may include one of the followings:

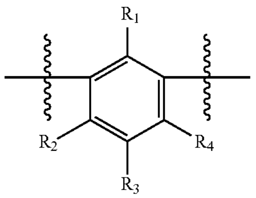

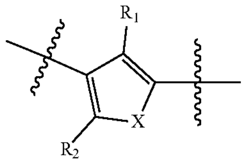

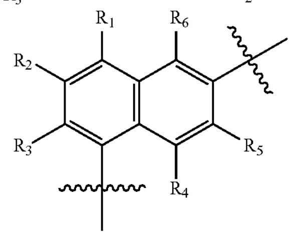

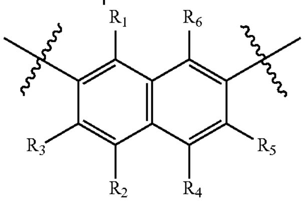

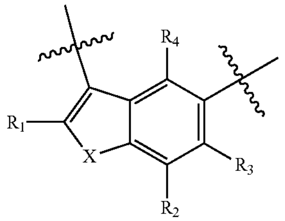

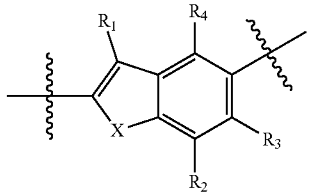

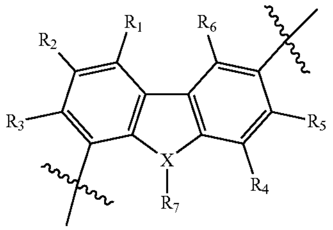

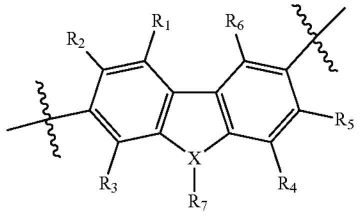

-continued

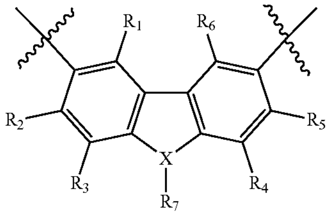

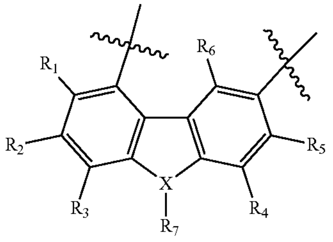

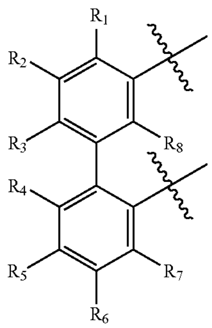

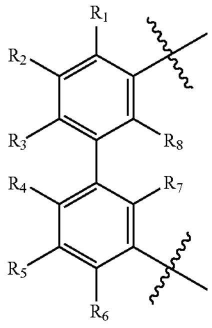

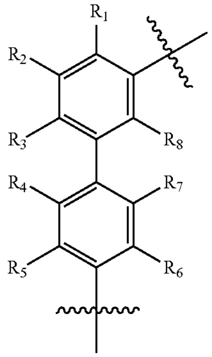

-continued
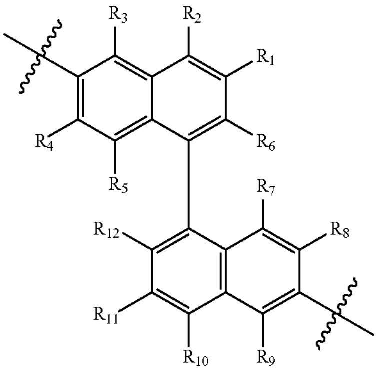
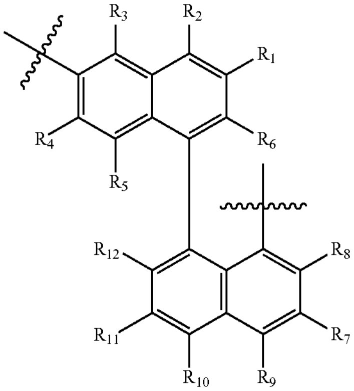
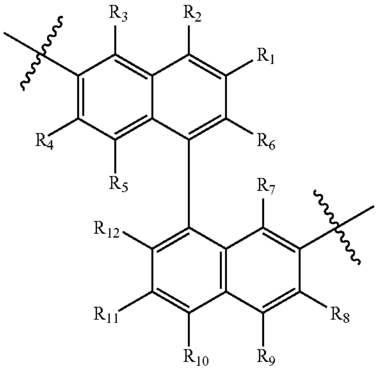
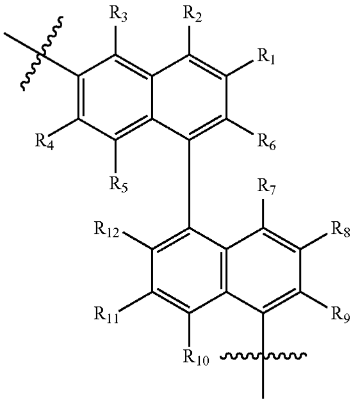
-continued
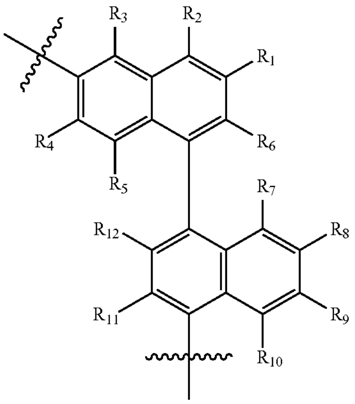
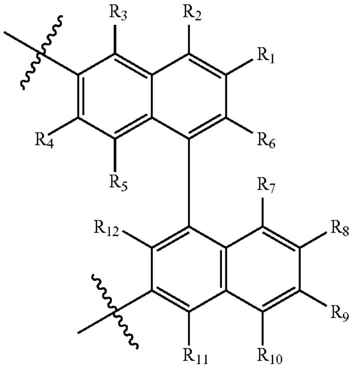
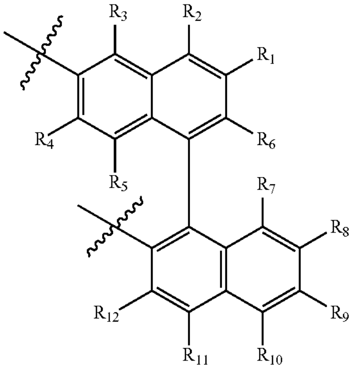
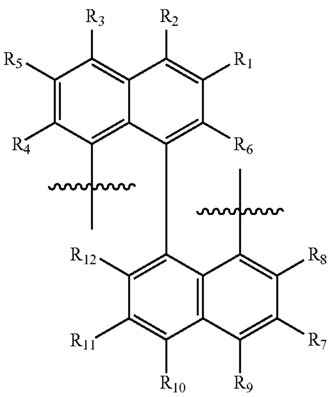

-continued
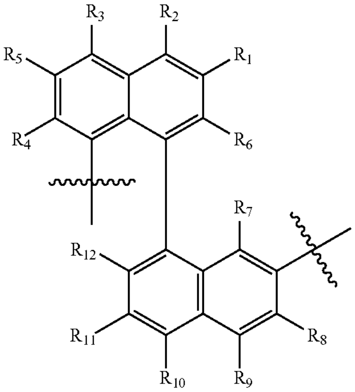
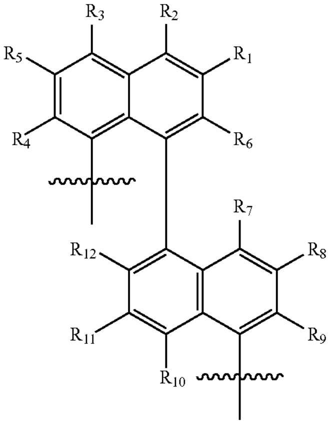
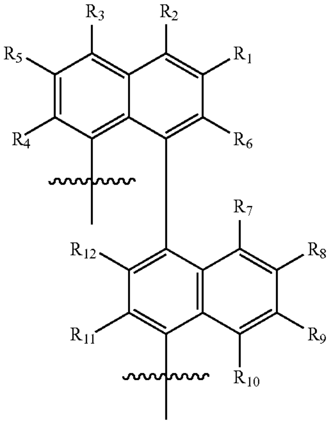
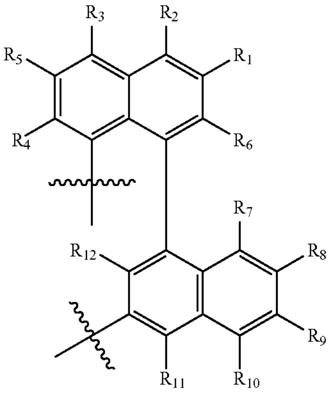
-continued
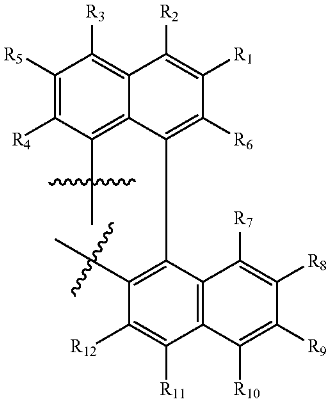
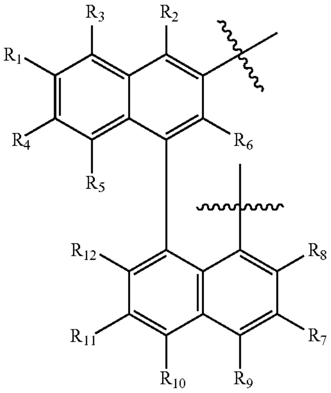
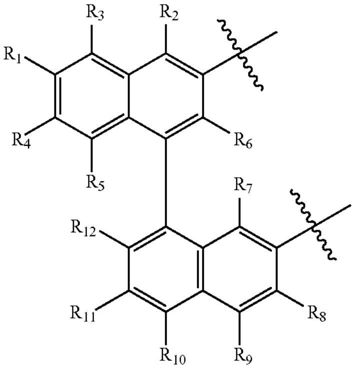
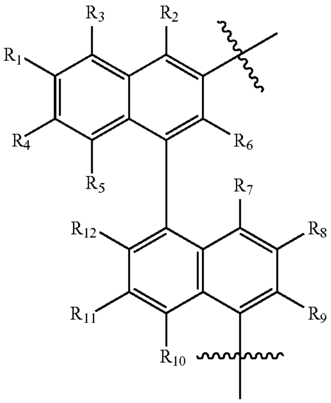

-continued
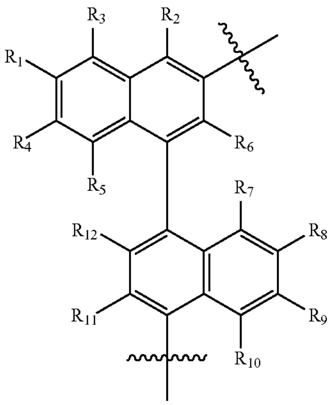
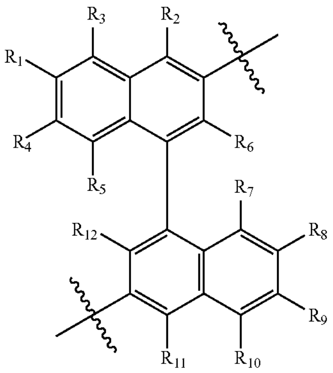
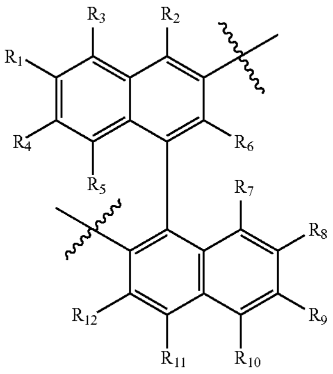
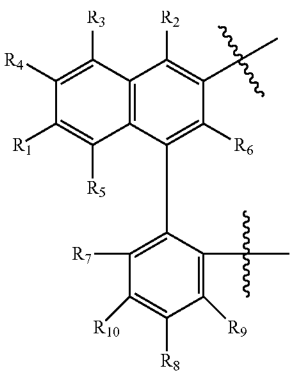
-continued
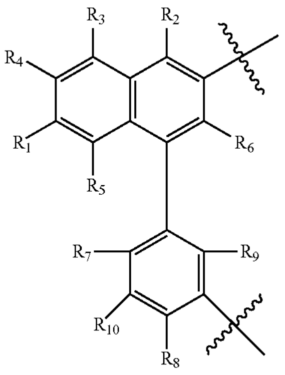
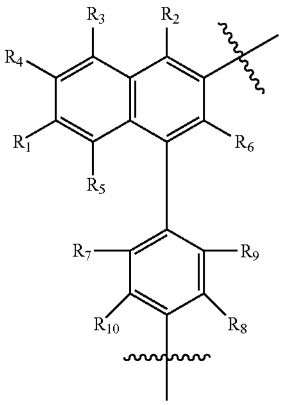
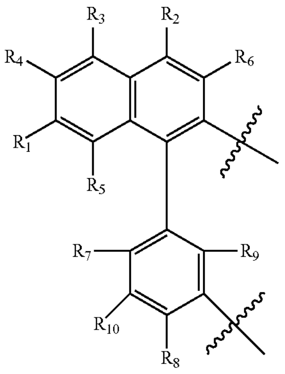
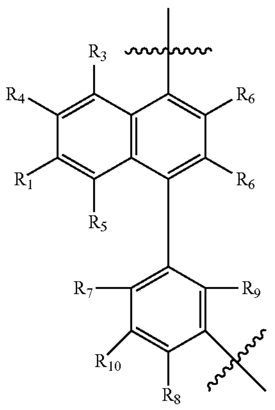

-continued
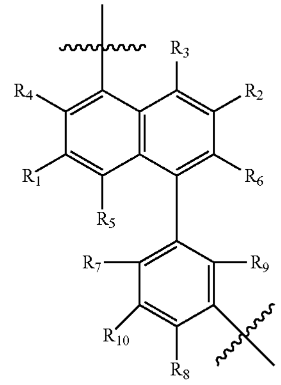
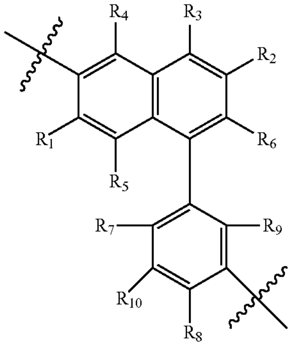
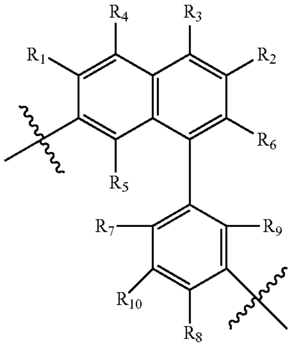
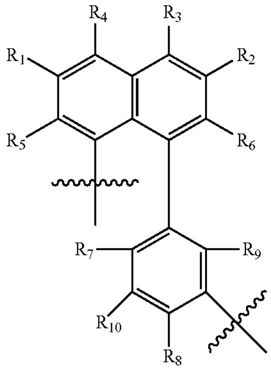
-continued
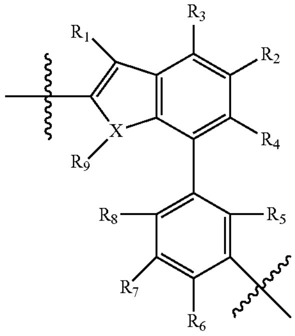
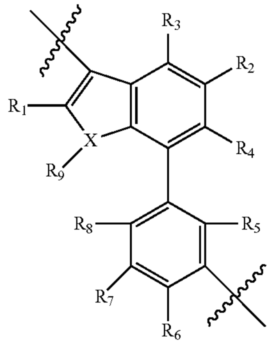
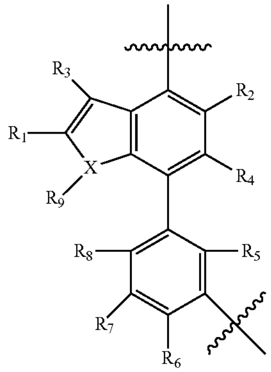
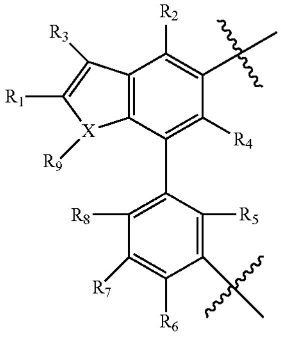
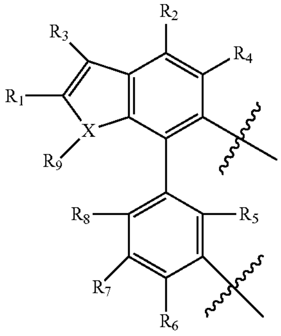

-continued
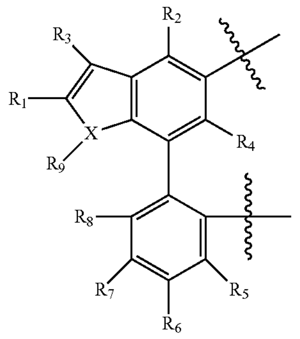
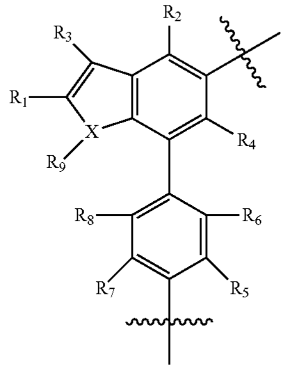
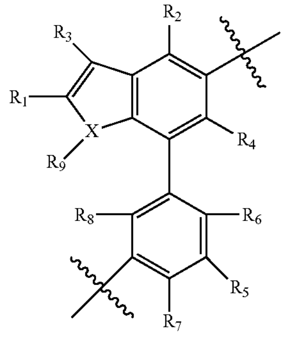
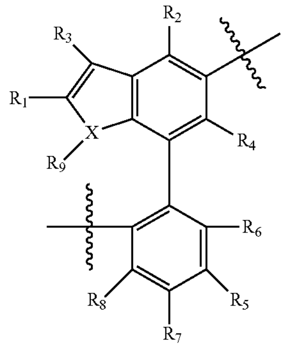
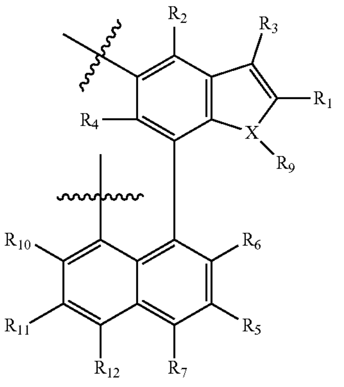
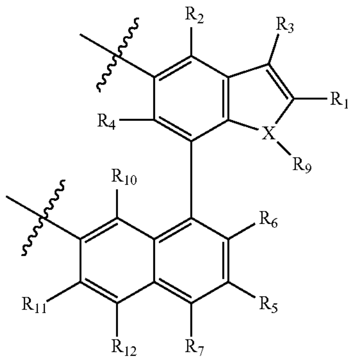
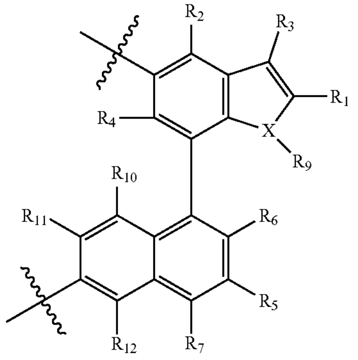
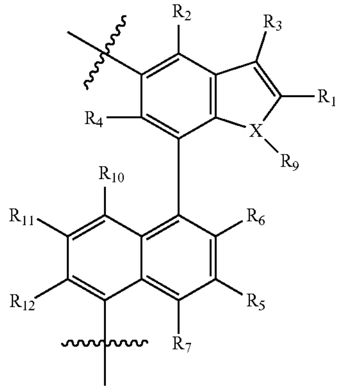

-continued

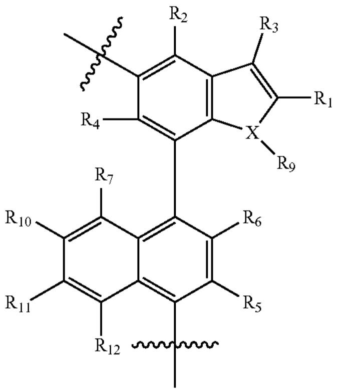

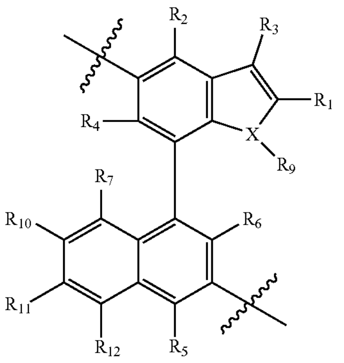

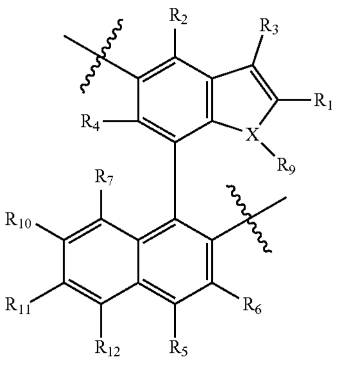

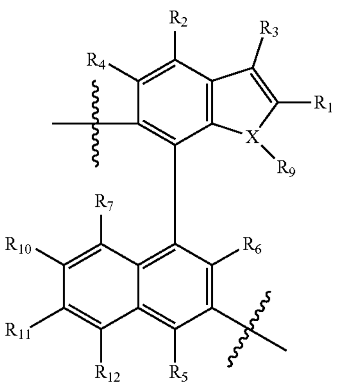

-continued

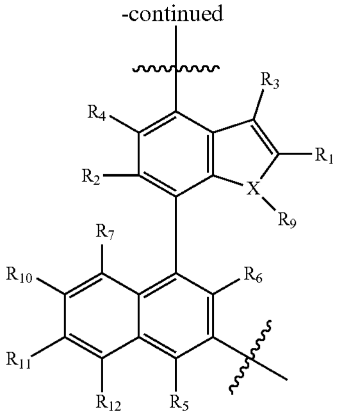

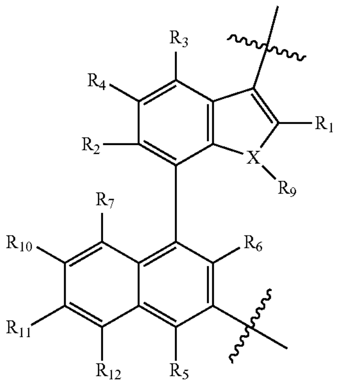

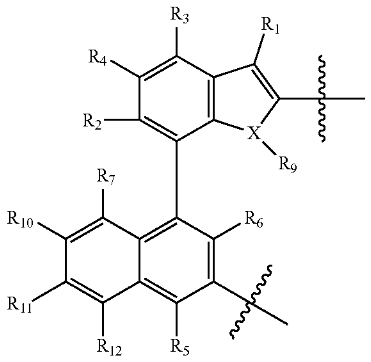

wherein X is S, Se, N, C, or O; $R_1$-$R_{12}$ is independently selected from the following substituents, including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-Cis aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl; and the wavy lines represent the meta-positions.

The one or more Ars may include, but is not limited to, any one of a thiophene-based unit, a furan-based unit, a selenophene-based unit, or a pyrrole-based unit with a formula of

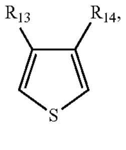
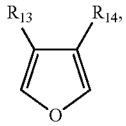
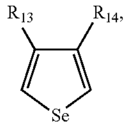
or
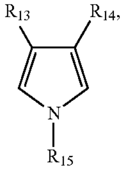

or any combination thereof.

In the structures above, each of $R_{13}$, $R_{14}$ and $R_{15}$ is independently selected from the following substituents, including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl.

An example thiophene-based unit may include, but is not limited to, the formula of

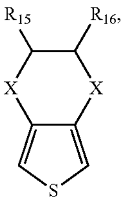
or
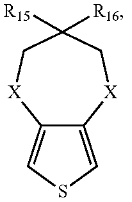
or
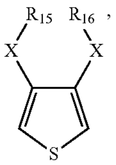
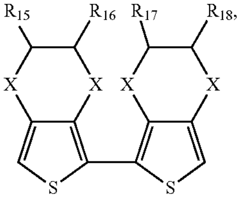
or
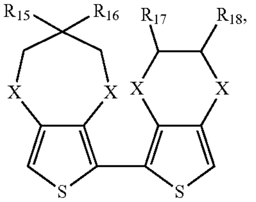
or
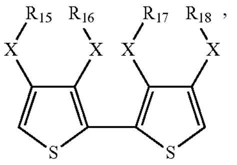
or
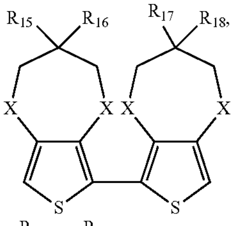
or
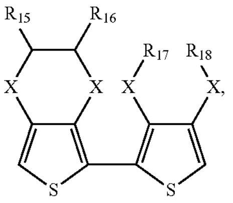
or
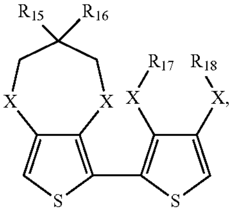
or -continued

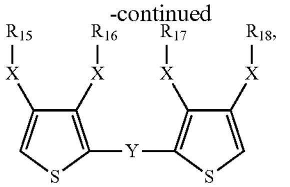
or
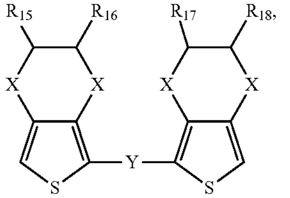
or
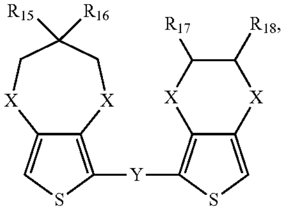
or
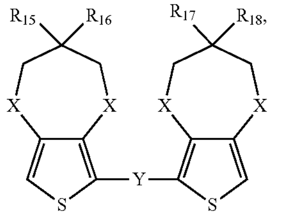
or
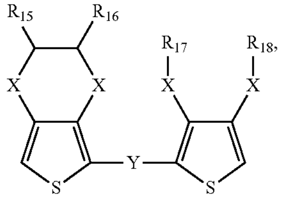
or
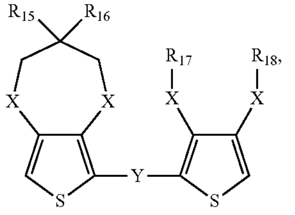

or a combination thereof.

In the structures above, X is S, Se, N, C, or O; each of $R_{15}$-$R_{18}$ is independently selected from the following substituents, including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl. Y is any one or more of Ars, or aromatic structures, or fused aromatic structures, or a combinations thereof.

In some embodiments, the X in the thiophene-based unit is O.

By introducing meta-conjugation into the electrochromic polymer backbone, the electronic conjugation along the polymer backbone is interrupted and leads to a high bandgap (>2.0 eV). Thus, the disclosed electrochromic polymer appears highly transmissive (or even transparent) in the neutral state. Oxidation of the ECP results in a lower bandgap (<1.5 eV), and the absorbance of the polymer is red-shifted from UV region to visible and near-IR region. Thus, the polymer becomes highly colored.

The one or more Ars might include one or more aromatic structures or fused aromatic structures. By controlling the types and amounts of the Ars, the redox potentials of the disclosed electrochromic polymer can be easily tuned while maintaining its high transparency within the visible light range in the neutral state. For example, more electron-rich units (e.g., dioxythiophenes) can be introduced onto the backbone to make the polymer more favorable to be oxidized, thereby decreasing its onset potential and improving its electrochemical stability and electrochromic cycling stability. The redox potentials of the disclosed electrochromic polymer can also be adjusted by varying substituents on MCLs (e.g., introducing alkoxy side chains).

The disclosed electrochromic polymers can be dissolved in a solvent, for example, toluene or p-xylene, which can be used for solution-processable film casting processes. By controlling the concentration of the polymer solution, a polymer thin film with a controllable thickness can be obtained. Furthermore, the excellent solubility makes the disclosed electrochromic polymers compatible with various casting methods, for example, spin-coating, spray-coating, and drop-casting. Manufacturing friendly process makes its extended applications feasible.

Examples are shown in the following.

EMBODIMENTS

Example 1 ECP-1

In some embodiments, the disclosed ECP-1 has a formula of

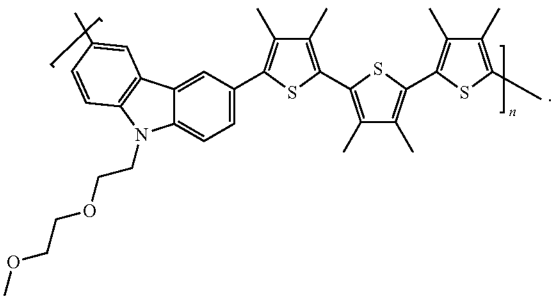

The ECP-1 is synthesized by preparing a carbazole-containing reaction unit and then polymerizing it with a dimer unit. The detail method includes the following steps:

Step 1-1: preparing a carbazole-containing reaction unit (compound 2).

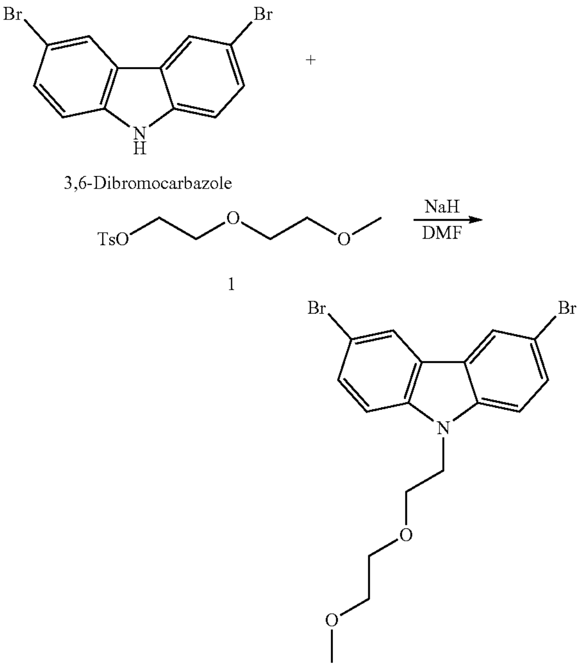

3,6-Dibromocarbazole

1 compound 2

3,6-Dibromocarbazole is dissolved in DMF. Subsequently, 1.2 eq of NaH is added, and the mixture is stirred for 2 hours. Then 1.2 eq compound 1 is added into the reaction, and the mixture is stirred overnight. After that water is added into the reaction to precipitate out the solid. The suspension is filtered to get the desired product compound 2 as a white solid.

Step 1-2: polymerization: carbazole-containing reaction unit polymerizing with a dimer unit.

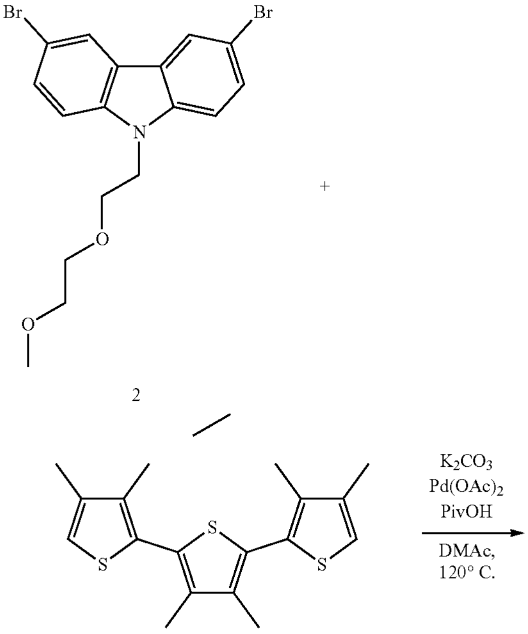

2

3

-continued

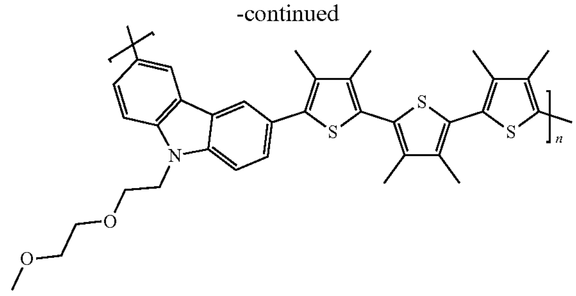

ECP-1

Compound 2 (1 eq), compound 3 (1 eq), $K_2CO_3$ (2.6 eq), PivOH(0.3 eq), $Pd(OAc)_2$, (0.02 eq) are added into a Schenk tube. Then vacuum (3-5 min) and refill the tube with nitrogen. Repeat this procedure for three times. Subsequently, nitrogen degassed solvent Dimethylacetamide (DMAc) is added, and the mixture is heated to 120° C. and last for 14 hours. Then the mixture is poured into methanol to precipitate out the crude polymer solid. Filter to get the solid and re-dissolve the solid into chloroform and wash with water for three times. The chloroform solution is added into large amount of methanol and precipitate out the polymer. The suspension is filtered to get the desired product polymer ECP-1.

Figure 2:
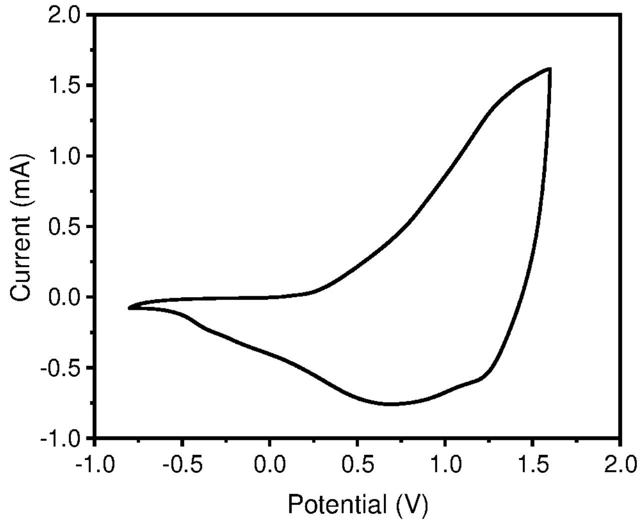
FIG. 2 is the CV data of an exemplary solid-state device using an example ECP-1, according to one embodiment.
Figure 3:
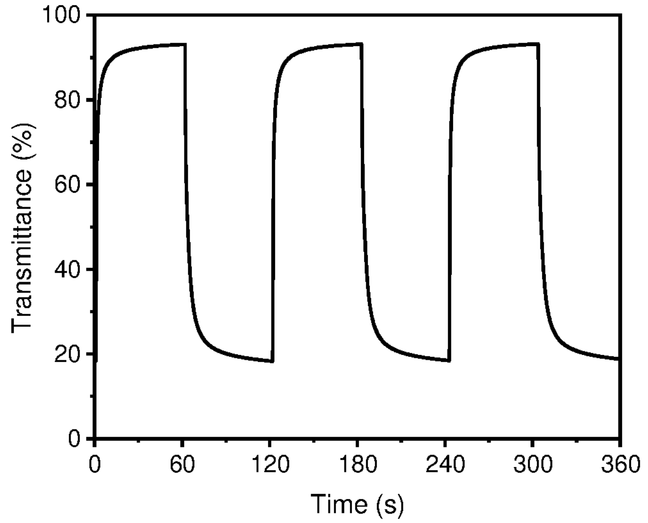
FIG. 3 is the switching kinetics of the exemplary solid-state device using the example ECP-1 at 545 nm, according to one embodiment.
Figure 4:
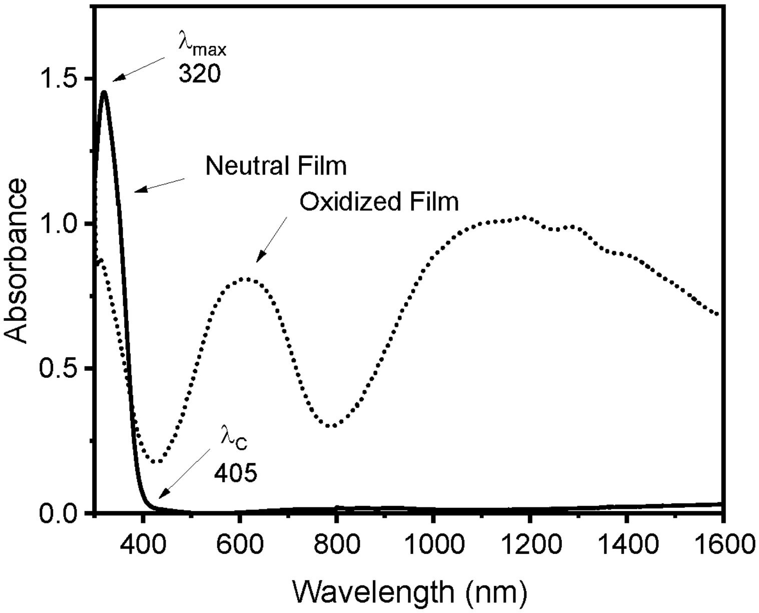
FIG. 4 are the absorbance spectra of the exemplary ECP-1 thin film at different voltages, according to one embodiment.

The obtained ECP-1 has an oxidation potential of around 0.75 V (vs. Ag/AgCl) and an energy bandgap of higher than 3.0 eV. The ECP-1 is fabricated into a solid-state ECD with ECP-1 used as the electrochromic layer, 0.2M of LiTFSI in PEGDA as the electrolyte, and VOx as the ion storage layer. The solid-state ECD can be stably switched between −0.5 V to 1.5 V (FIG. 2). The neutral state and oxidized absorbance spectra of the ECP-1 are shown in FIG. 4 with ƛc of 405 nm and ƛmax of 320 nm. The solid-state ECD shows a high transparency with transmittance as high as 93% in the neutral state (FIG. 3), and switches to a bright blue color when ECP-1 is oxidized with one absorption peak at about 614 nm and another boarder absorption band at the near-IR region, around 900-1100 nm (FIG. 4). The optical contrast of the solid-state ECD is about 75% (FIG. 3).

Example 2 ECP-2

In some embodiments, the disclosed ECP-2 has a formula of

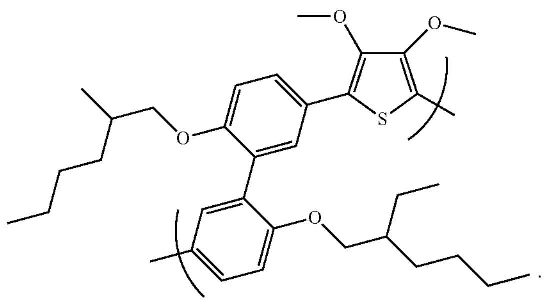

The ECP-2 is synthesized by first preparing a substituted benzene reaction unit and then polymerizing it with an acyclic dioxythiophene (AcDOT) unit. The detail method includes the following steps:

Step 2-1: preparing a benzene-containing reaction unit (compound 4) by two steps.

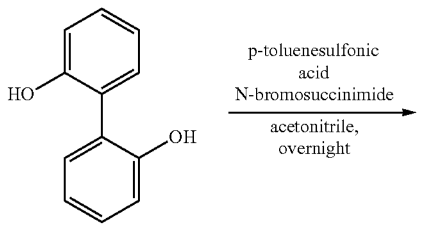

5

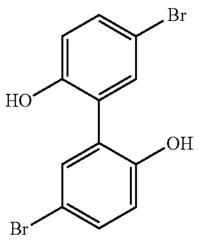

6

Compound 5 and p-toluenesulfonic acid are dissolved in acetonitrile. Subsequently, N-bromosuccinimide is added, and the mixture is agitated overnight. The suspension is filtered to get the desired product. The product compound 6 is a white solid.

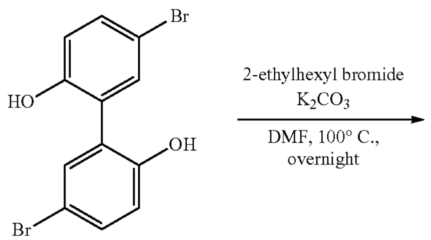

6

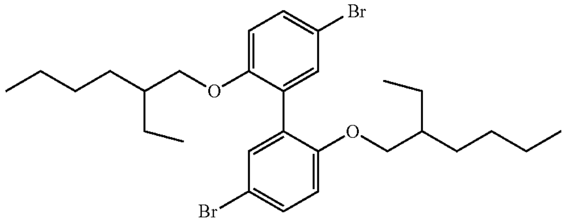

4

Compound 6 is dissolved in DMF under $N_2$. $K_2CO_3$ is added to the solution, and the reaction mixture is stirred for 15 mins, after which 2-ethylhexyl bromide is added. The reaction mixture is stirred at 100° C. overnight. The reaction is stopped and cooled down to room temperature. The solvent is removed in vacuum, and the residue is dissolved in diethyl ether. The organic phase is washed with water, and the aqueous phases are extracted with ethyl acetate. The combined organic phases are dried, and the volatiles is removed by vacuum. The crude is passed through a small silica column, and the solvent is dried in vacuum to get the compound 4 as a yellow oil.

Step 2-2: polymerization: The polymerization method is similar to that in step 1-2 with the reaction units of the substituted benzene reaction unit (compound 4) and AcDOT (compound 8) with a structure of Compound 8

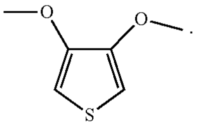

Figure 5:
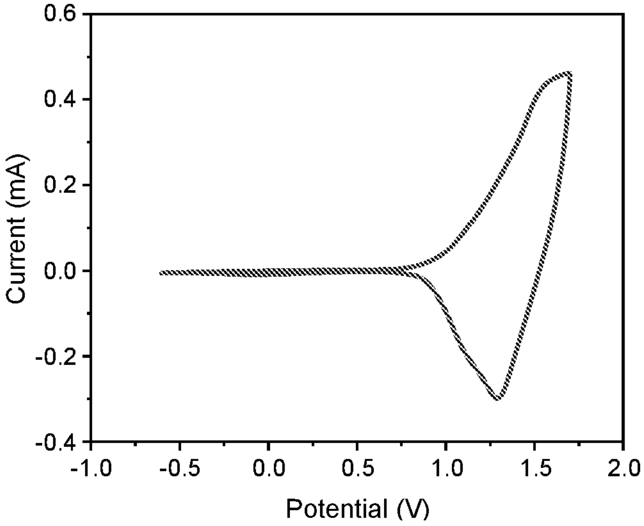
FIG. 5 is the CV data of an exemplary solid-state device using another example ECP-2, according to one embodiment.
Figure 6:
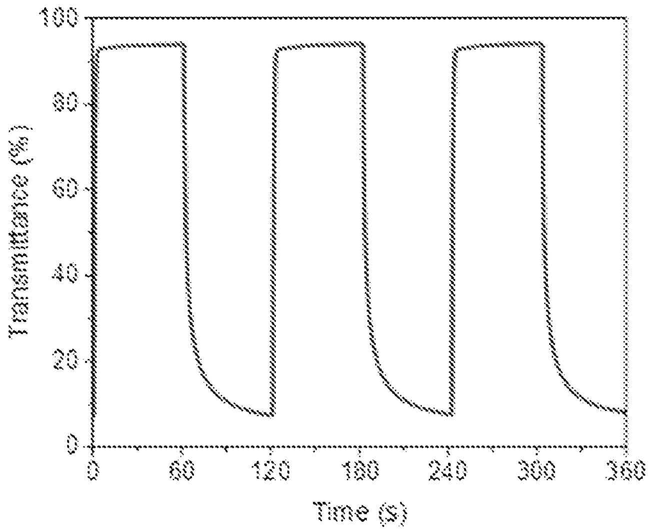
FIG. 6 is the switching kinetics of the exemplary solid-state device using the example ECP-2 at 550 nm, according to one embodiment.
Figure 7:
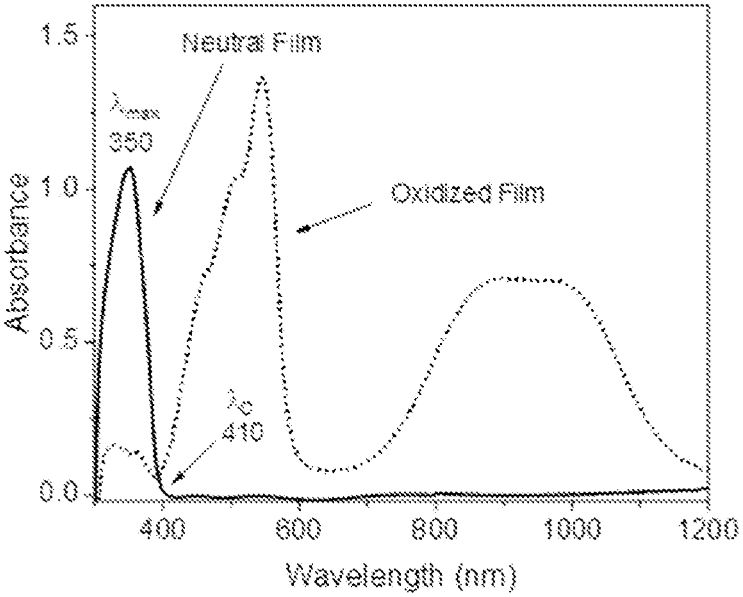
FIG. 7 are the absorbance spectra of the exemplary ECP-2 thin film at different voltages, according to one embodiment.

The obtained ECP-2 has a oxidation potential around 0.95 V (vs. Ag/AgCl) and an energy bandgap higher than 3.1 eV. The ECP-2 is fabricated into a solid-state ECD with ECP-2 used as the electrochromic layer, 1M of $LiPF_6$ in PEGMEA as the electrolyte, and $VO_x$ as the ion storage layer. The solid-state ECD can be stably switched between −0.6 V to 1.7 V (FIG. 5). The neutral state and oxidized state absorbance spectra of the ECP-2 are shown in FIG. 7 with $\lambda_c$ of 410 nm and $\lambda_{max}$ of 350 nm. The solid-state ECD shows high transparency with transmittance as high as 94% at neutral state at 550 nm (FIG. 6), and switches to bright red color when ECP-2 is oxidized with one absorption peak at around 546 nm and another broader absorption band at the wavelength around 800-1100 nm (FIG. 7). The optical contrast of the solid-state ECD is 87% (FIG. 6).

Example 3 ECP-3

In some embodiments, the disclosed ECP-3 has a formula of

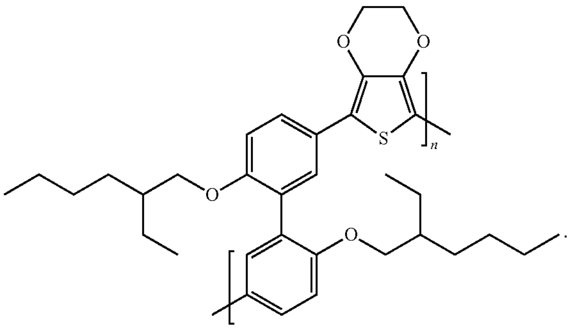

ECP-3 is synthesized by preparing a benzene-containing reaction unit and polymerizing it with a ProDot unit. The detail method includes the following steps:

Step 3-1: the same as Step 2-1

Step 3-2: polymerization: The polymerization method is similar to that in step 1-2 with the different reaction units of benzene-containing reaction unit (compound 4) and 3, 4-Ethylenedioxythiophene (EDOT, compound 9) with a structure of Compound 9

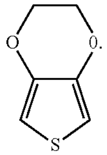

Example 4 ECP-4

In some embodiments, the disclosed ECP-4 has a formula of

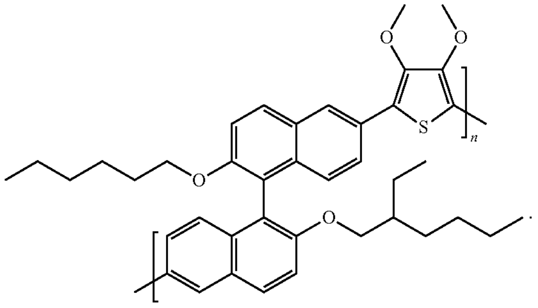

The ECP-4 is synthesized by preparing a naphthalene-containing reaction unit and then polymerizing it with an AcDOT unit. The detail method includes the following steps:

Step 4-1: preparing naphthalene-containing reaction unit (compound 10) by two steps.

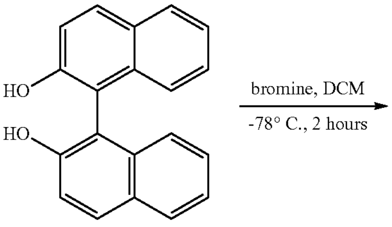

11

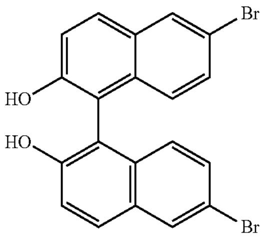

12

To a solution of compound 11 in dichloromethane was added dropwise a solution of bromine in dichloromethane over 15 minutes at −78° C. The reaction mixture is stirred for 2 hours at −78° C. and then warmed gradually to room temperature and stay at room temperature for an additional 2 hours. The excess bromine was quenched by saturated aqueous sodium sulfite solution and stirred for 2 hours at room temperature. After extraction with dichloromethane, the combined organic layer was washed with brine, dried over sodium sulfate, and concentrated in vacuum.

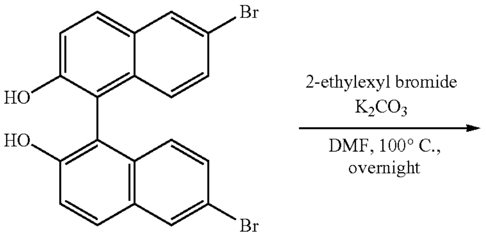

12

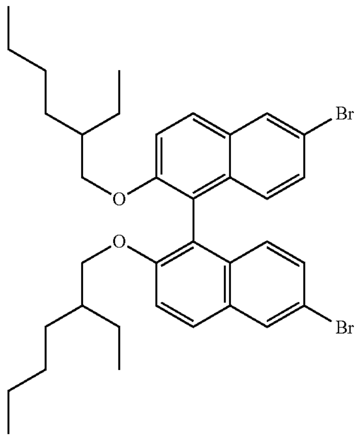

10

Compound 12 is dissolved in DMF under $N_2$, $K_2CO_3$ is added to the solution, and the reaction mixture is stirred for 15 minutes, after which 2-ethylexyl bromide is added. The reaction mixture is stirred at 100° C. overnight. The reaction is stopped and cooled down to room temperature. The solvent is removed in vacuum, and the residue is dissolved in diethyl ether. The organic phase is washed with water, and the aqueous phases are extracted with ethyl acetate. The combined organic phases are dried by vacuum.

Step 4-2: polymerization: The polymerization method is similar to that in step 1-2 with the different reaction units of the naphthalene-containing reaction unit (compound 10) and AcDOT (compound 8).

Example 5 ECP-5

In some embodiments, the disclosed ECP-5 has a formula of

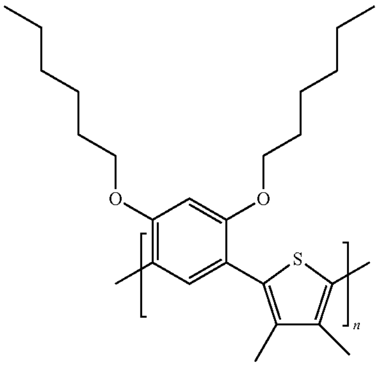
.

The ECP-5 is synthesized by a similar polymerization method to that in step 1-2 with the different reaction units of 1,5-dibromo-2,4-bis(hexyloxy)benzene and 3,4-dimethyl-thiophene.

In some embodiments, the disclosed ECP has a formula of

ECP-7

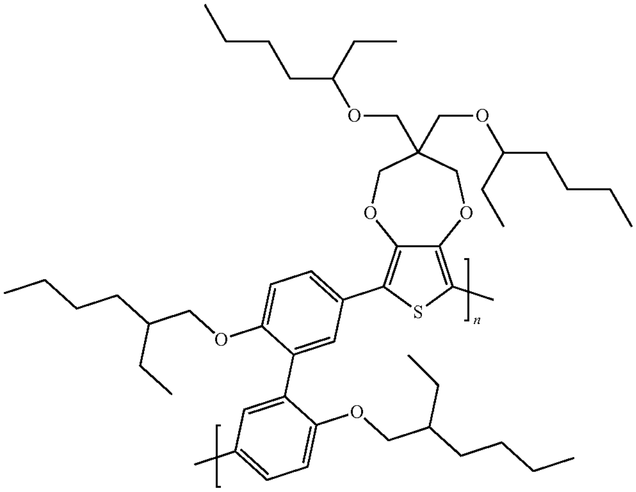
, or

-continued
ECP-8
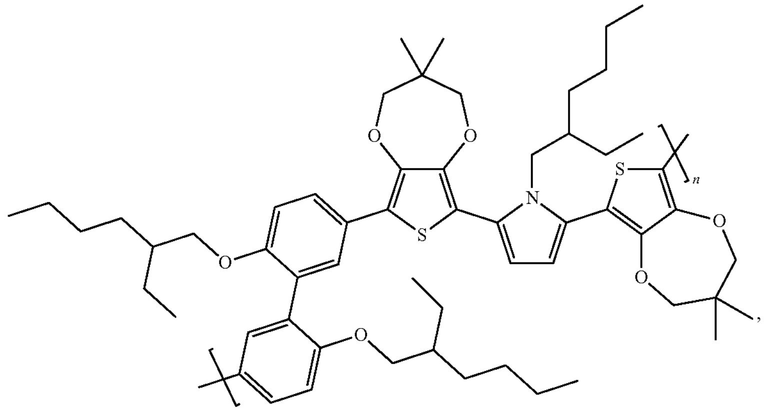
, or
ECP-9
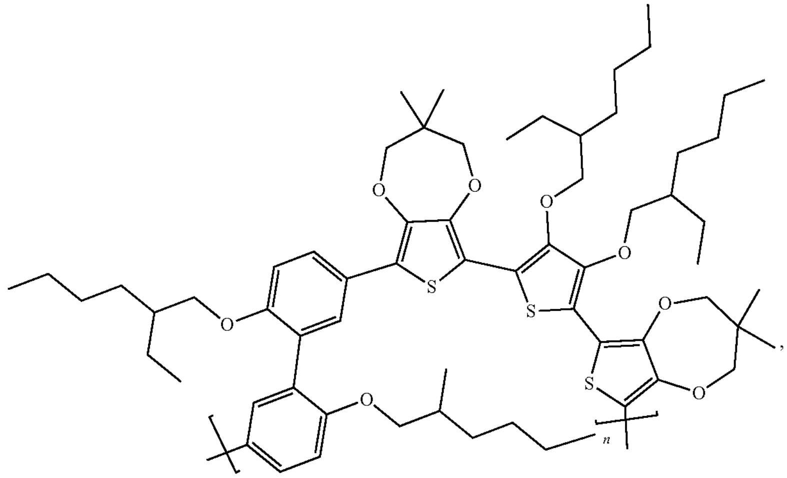
, or
ECP-10
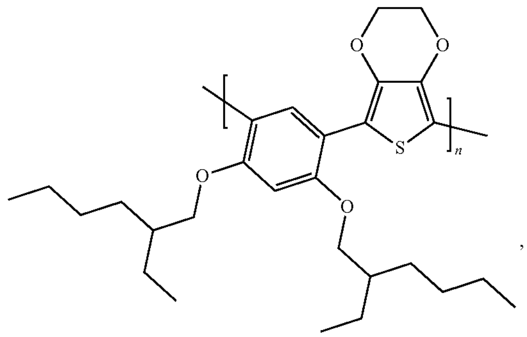
, or
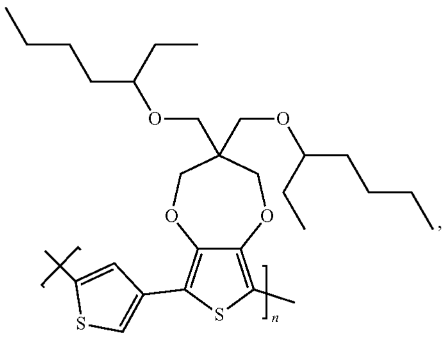
, or -continued
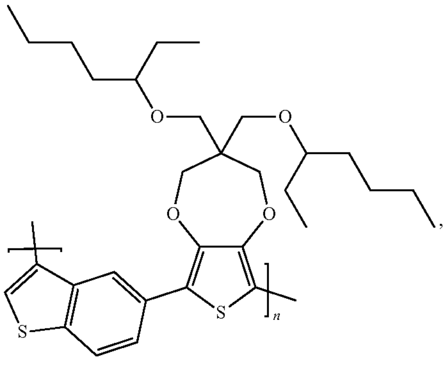
, or
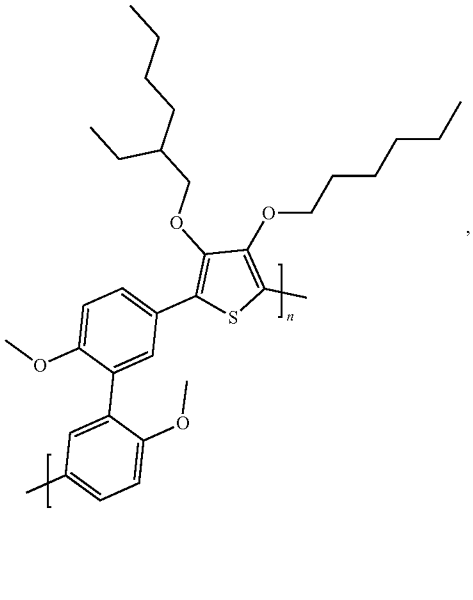
, or
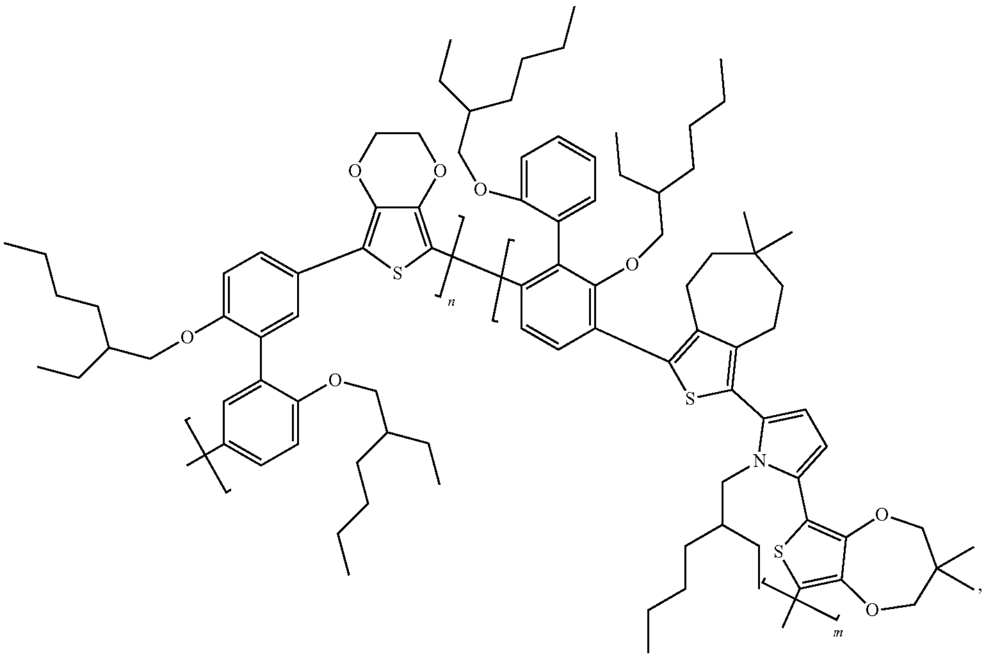
, or
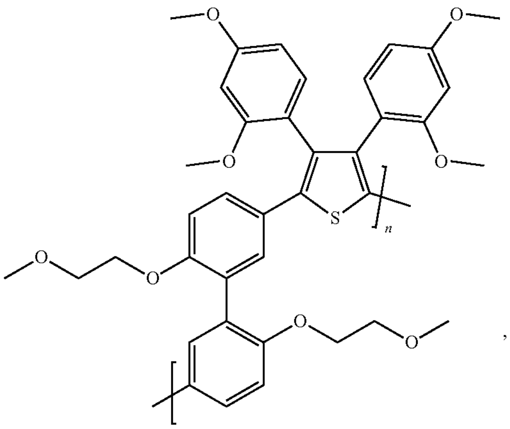
, or
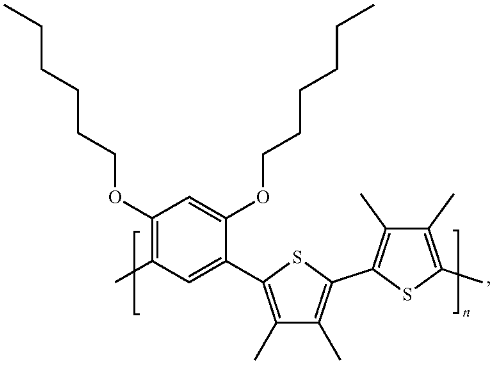
, or -continued
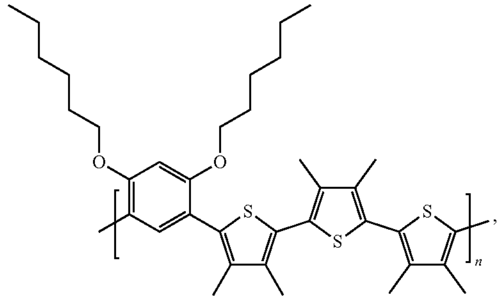
, or
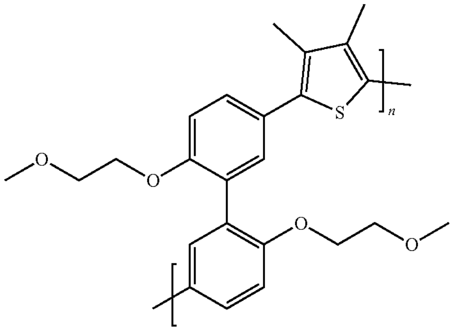
, or
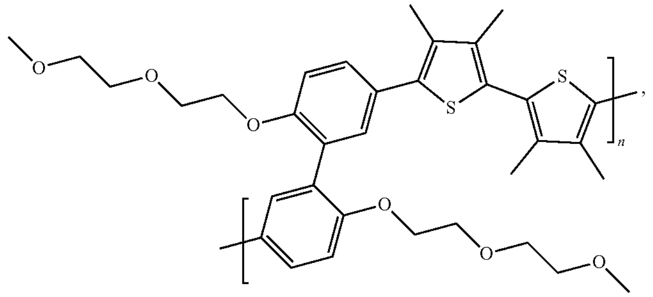
, or
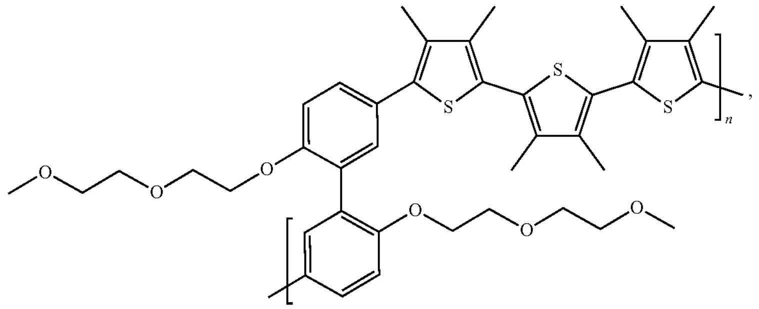
, or
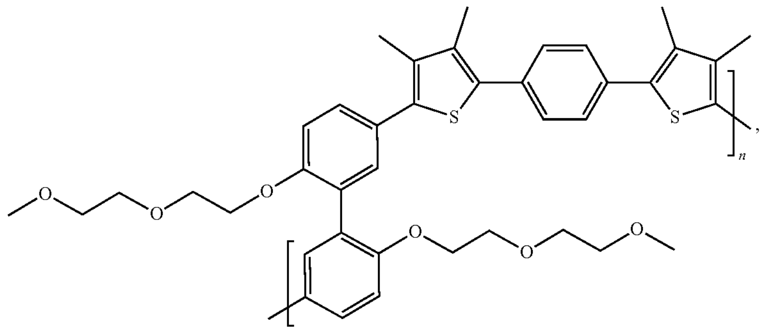
, or
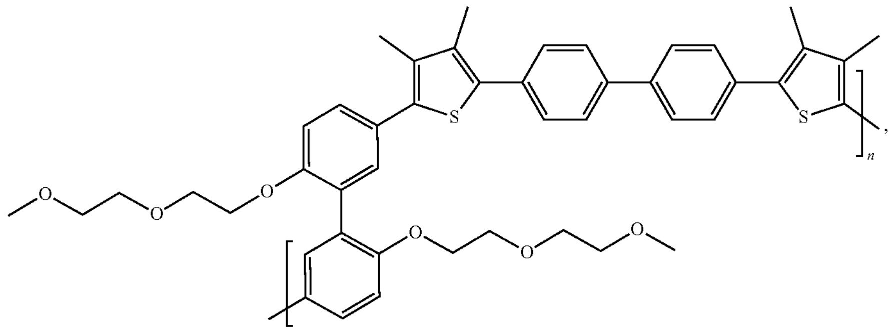
, or -continued
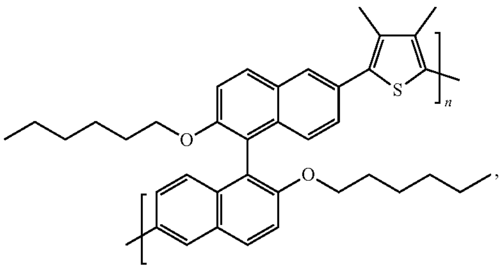
, or
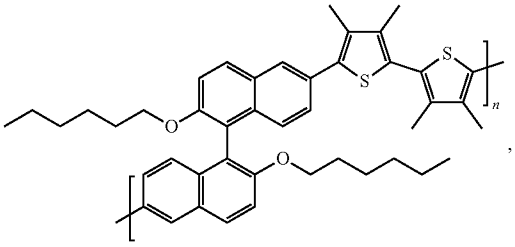
, or
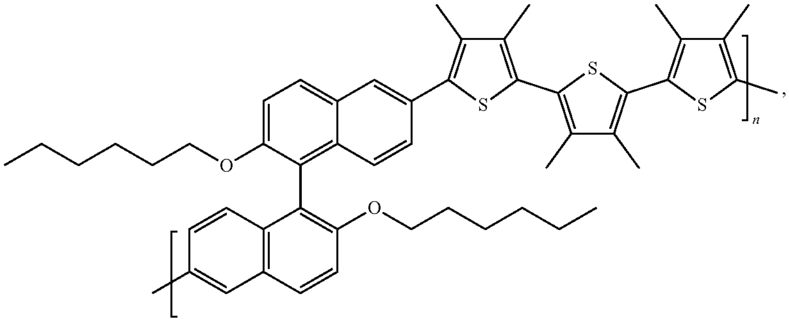
, or
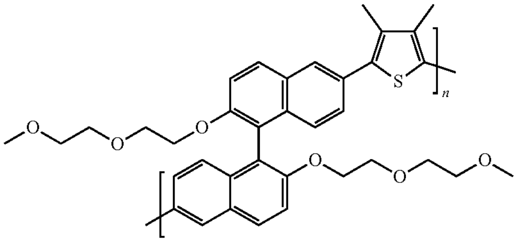
or
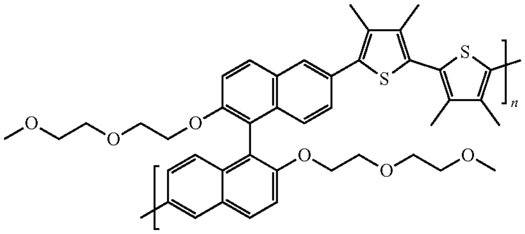
or
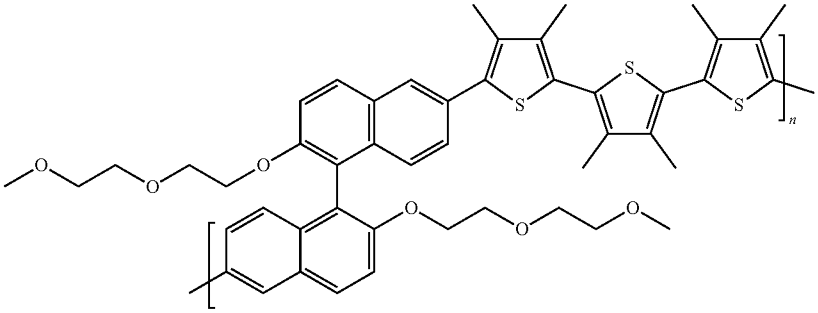
or
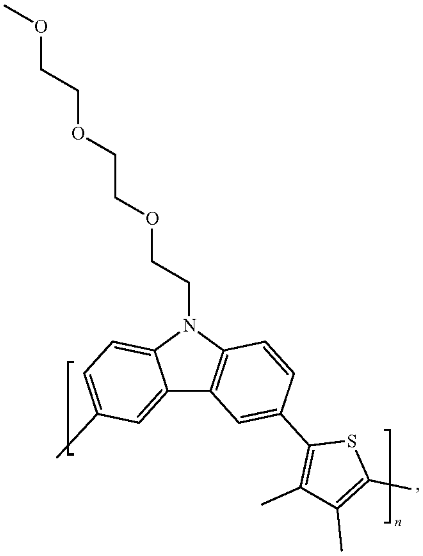
, or
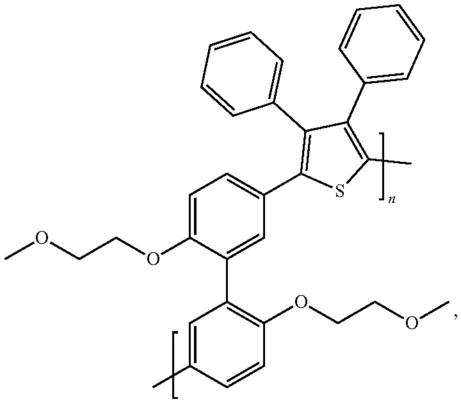
, or -continued

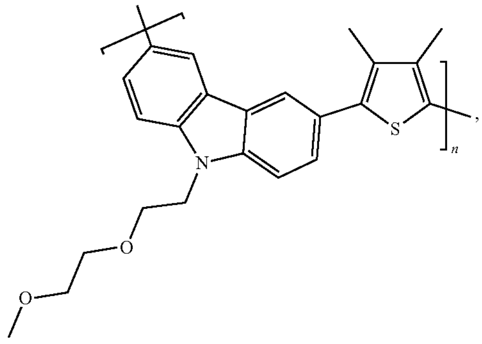

, or

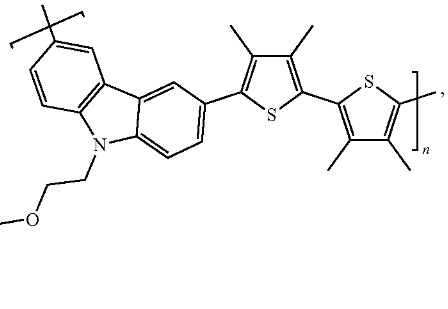

, or

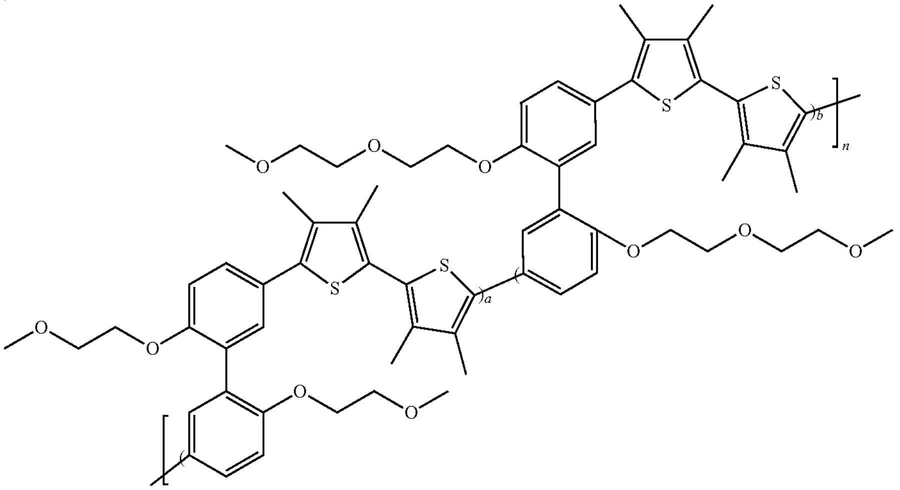

wherein n and m are integers greater than 0, a and b are integers equal to or greater than 0 with at least one of a and b is greater than 0.

In another aspect, the disclosed polymers can have fluorescent emission and can be applied to fluorescent products.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. An electrochromic polymer, consisting of:

a polymer backbone comprising one or more meta-conjugated linkers (MCLs) and one or more aromatic moieties (Ars), wherein each of the one or more MCLs is partially conjugated with the one or more Ars at meta positions of the one or more MCLs, wherein the electrochromic polymer has an energy bandgap equal to or higher than 2.9 eV and less than 4.0 eV in a neutral state.

2. The electrochromic polymer of claim 1, wherein the electrochromic polymer has an absorption maximum ($\lambda_{max}$) smaller than 410 nm in the neutral state.

3. The electrochromic polymer of claim 1, wherein the electrochromic polymer is colorless in the neutral state.

4. The electrochromic polymer of claim 1, wherein the electrochromic polymer has absorption in visible and/or near-infrared wavelengths in an oxidized state.

5. The electrochromic polymer of claim 4, wherein the electrochromic polymer has an absorption coefficient larger than $10^4$ $cm^{-1}$ in the oxidized state.

6. The electrochromic polymer of claim 1, wherein the electrochromic polymer has an oxidation potential in the ranges of 0.1-1.5 V inclusive versus Ag/AgCl electrode.

7. The electrochromic polymer of claim 1, wherein the one or more MCLs comprise at least one of an aromatic structure, or a fused aromatic structure.

8. The electrochromic polymer of claim 7, wherein the one or more MCLs comprise the aromatic structure, wherein the aromatic structure comprises a benzene or heterocyclic structure.

9. The electrochromic polymer of claim 7, wherein the one or more MCLs comprise the fused aromatic structure, wherein the fused aromatic structure comprises a fused benzene structure, or a fused heterocyclic structure, or a fused benzene and heterocyclic structure.

10. The electrochromic polymer of claim 1, wherein the one or more MCLs and the one or more Ars are arranged in an alternative fashion with a formula of $$-\!\!\left[MCL_1-Ar_1\right]_{m_1}\!\!-\!\!\left[MCL_2-Ar_2\right]_{m_2}\!\!- \cdots -\!\!\left[MCL_n-Ar_n\right]_{m_n}\!\!-,$$

wherein n is an integer greater than 0, and each of $m_1$, $m_2$, . . . , $m_n$ is an integer equal to or greater than 0 with at least one of $m_1$, $m_2$, . . . , $m_n$ is greater than 0.

11. The electrochromic polymer of claim 1, wherein each of the one or more MCLs and corresponding meta positions comprise one of the following formulas:
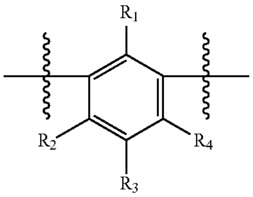
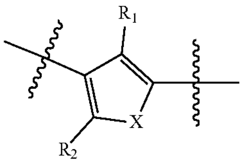
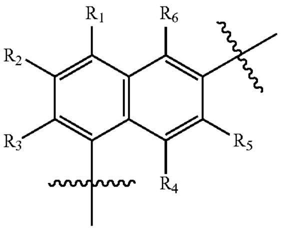
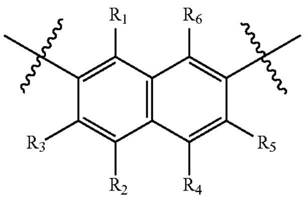
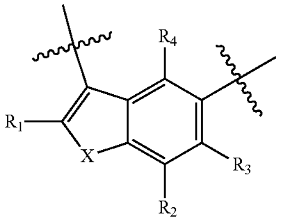
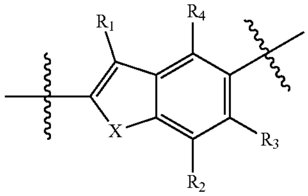
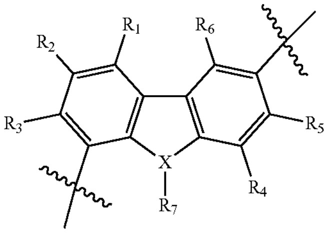
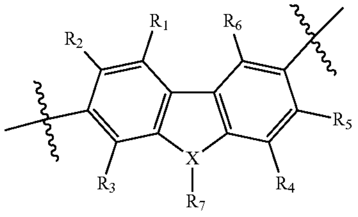
-continued
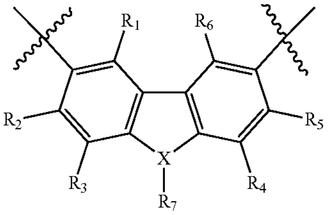
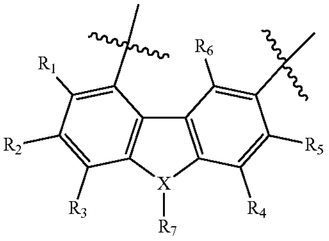
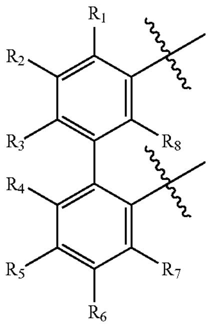
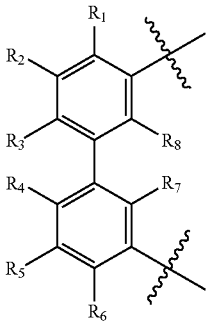
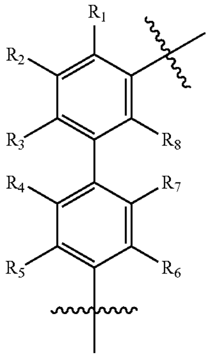

-continued
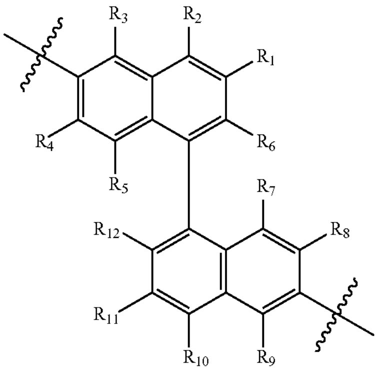
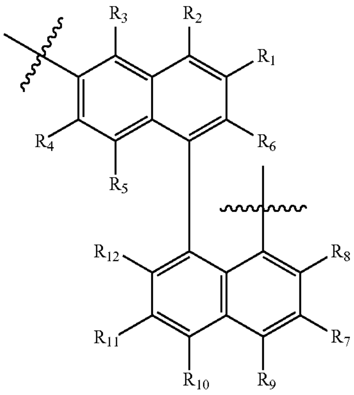
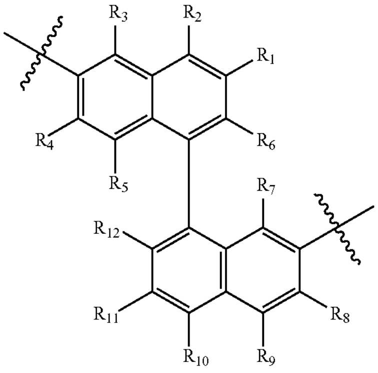
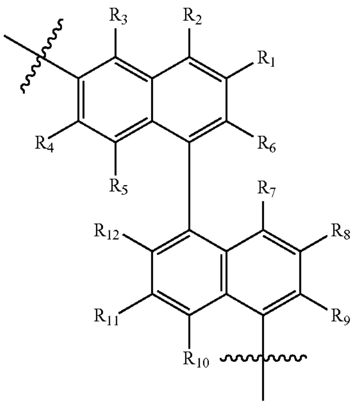
-continued
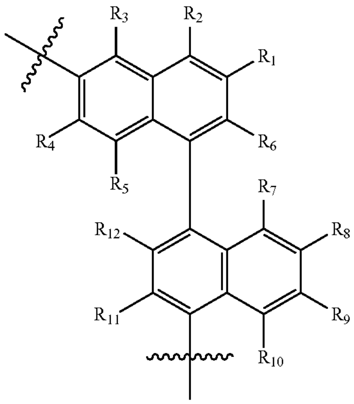
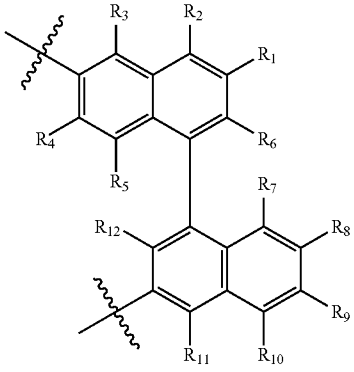
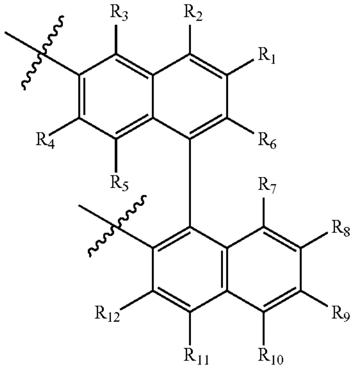
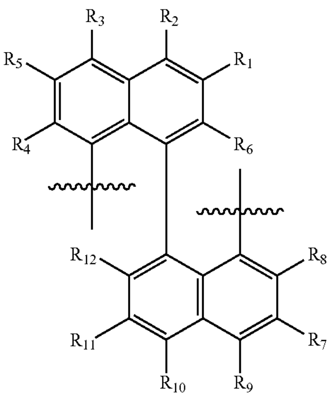

-continued
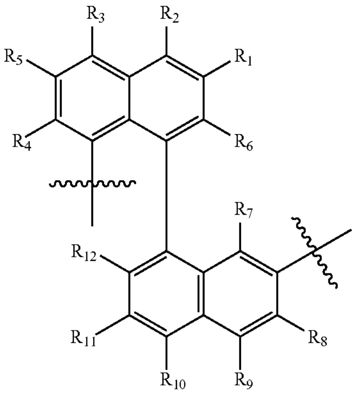
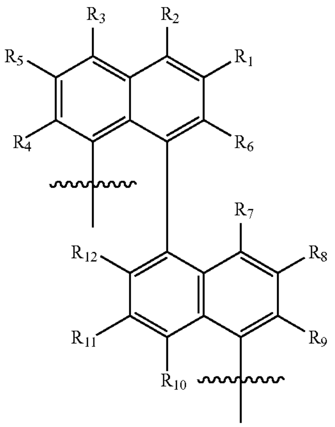
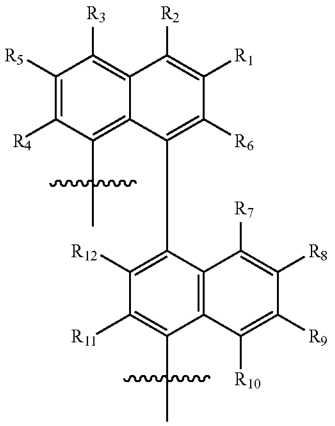
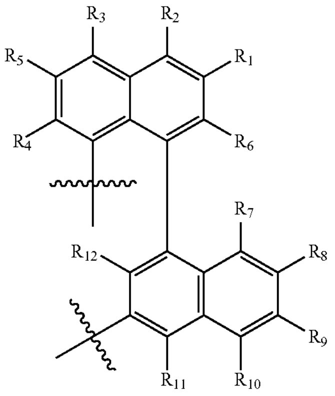
-continued
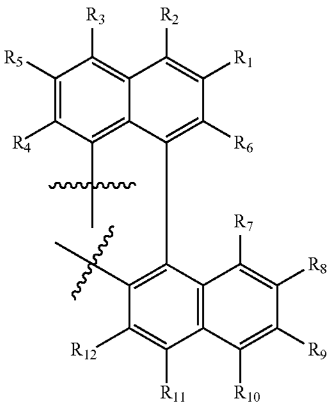
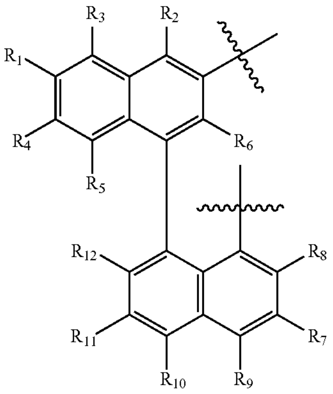
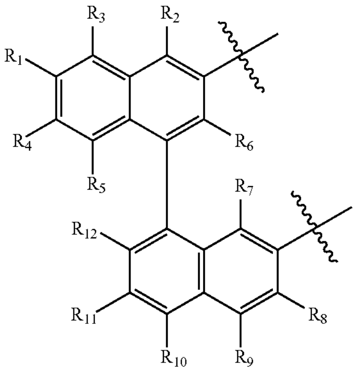
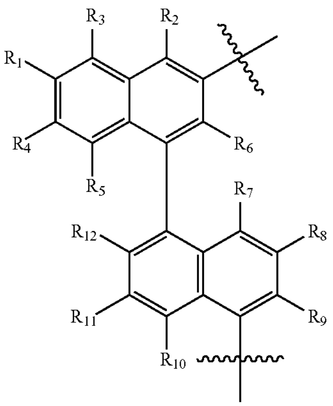

-continued
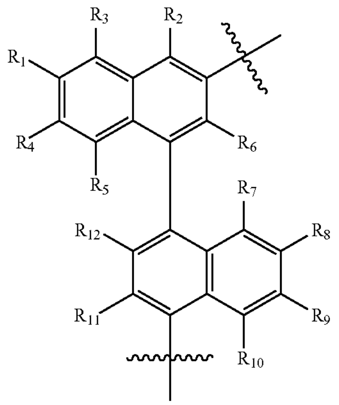
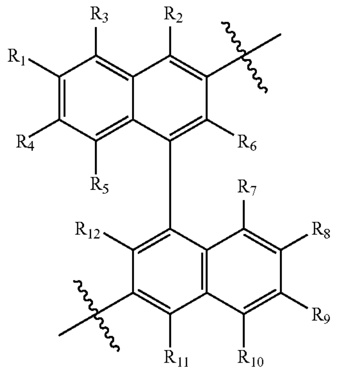
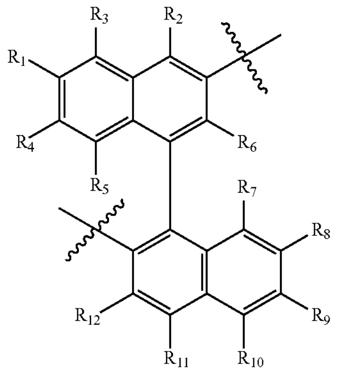
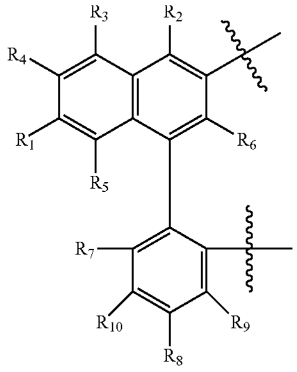
-continued
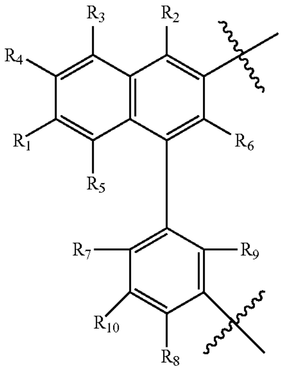
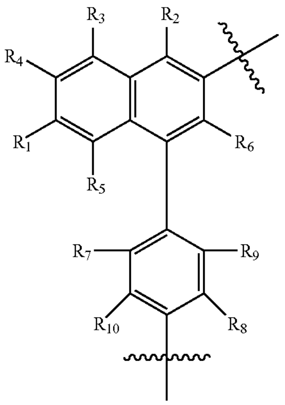
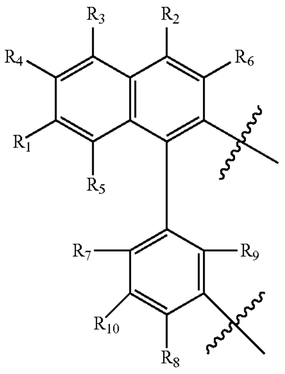
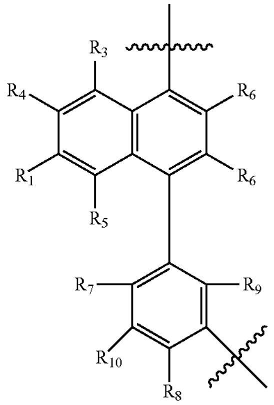

-continued
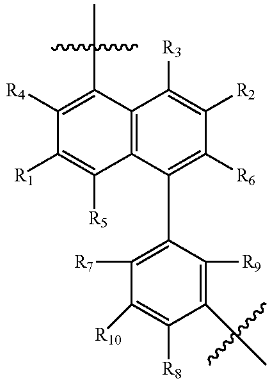
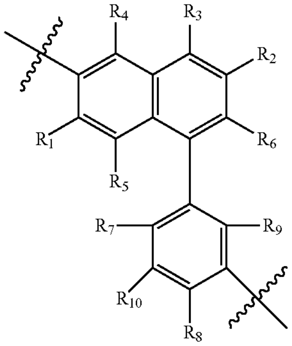
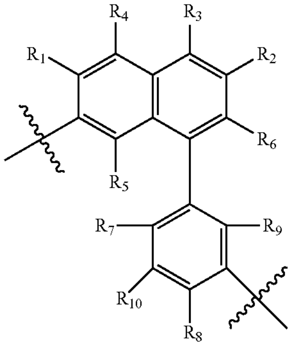
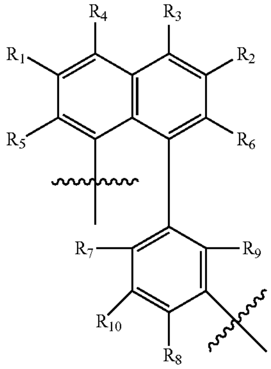
-continued
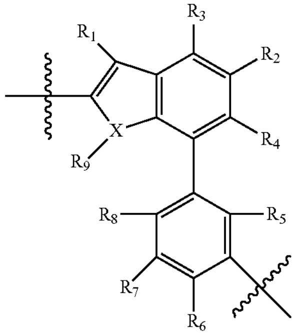
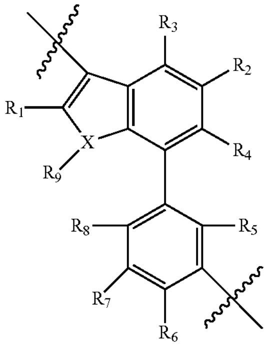
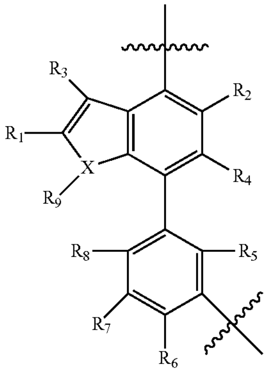
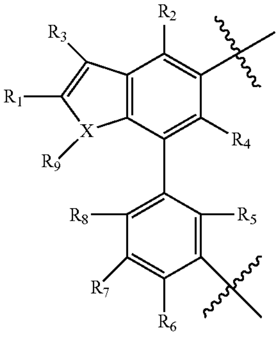
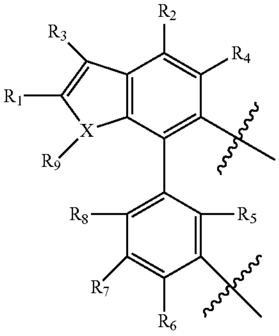

-continued
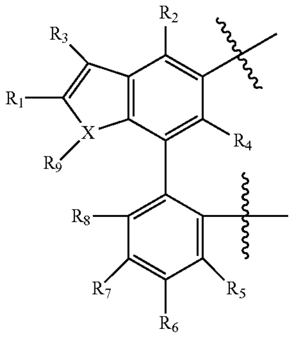
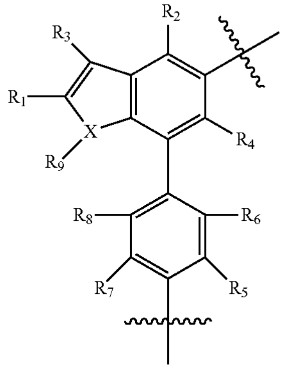
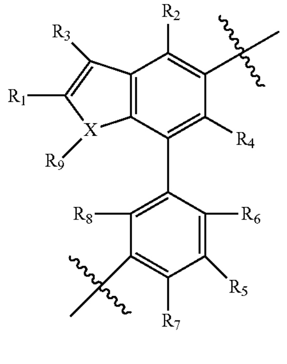
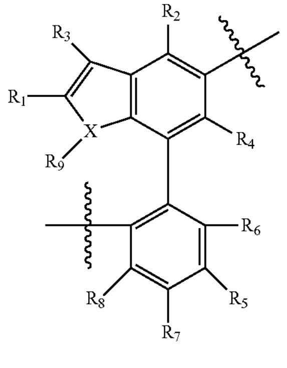
-continued
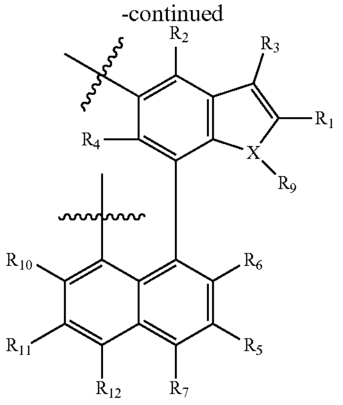
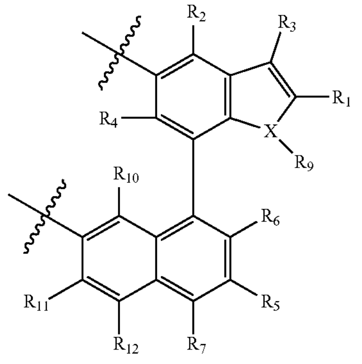
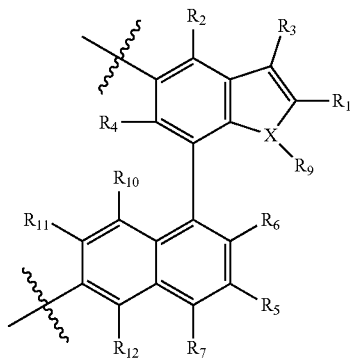
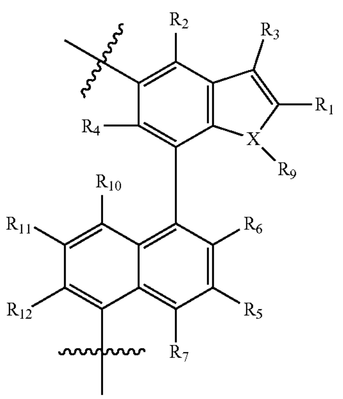

-continued

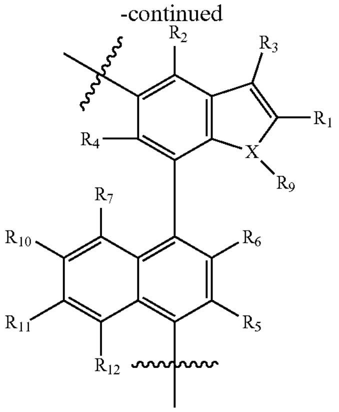

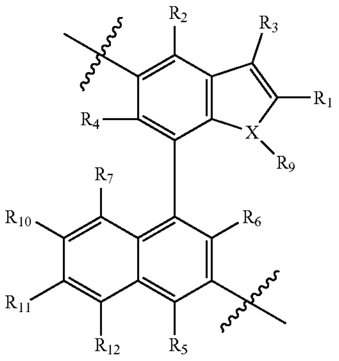

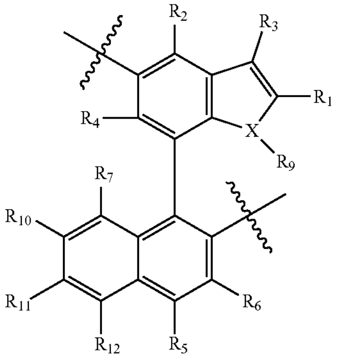

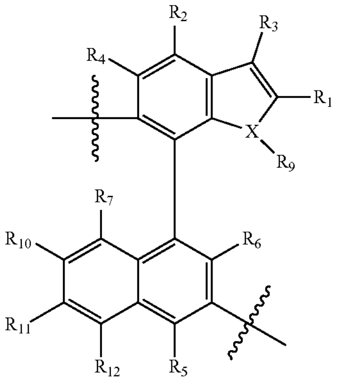

-continued

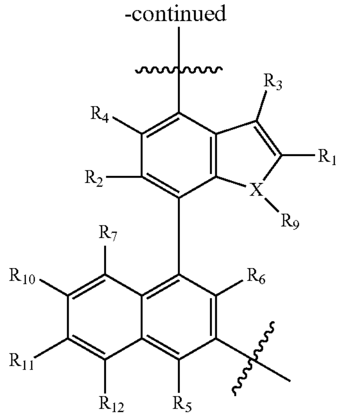

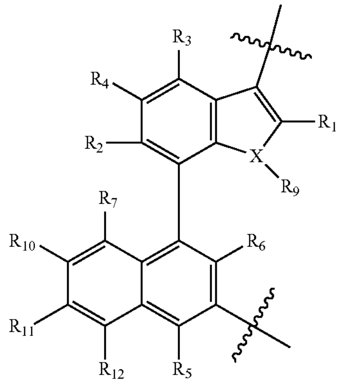

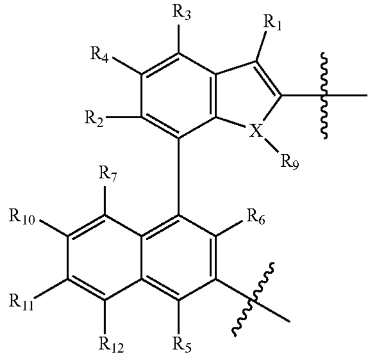

wherein X is S, Se, N, C, or O; each of $R_1$-$R_{12}$ is independently selected from one of hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl; and each of the wavy lines represents one of the meta positions.

12. The electrochromic polymer of claim 1, wherein each of the one or more Ars comprises one of a thiophene-based unit, a furan-based unit, a selenophene-based unit, or a pyrrole-based unit with one of the following formulas:

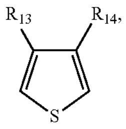
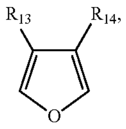
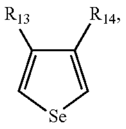
and

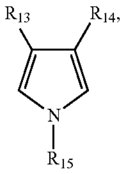

wherein each of $R_{13}$, $R_{14}$ and $R_{15}$ is independently selected from one of hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl.

13. The electrochromic polymer of claim 1, wherein each of the one or more Ars comprises a thiophene-based unit, wherein the thiophene-based unit comprises one of the following formulas:

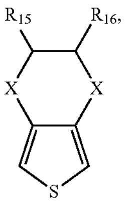
or
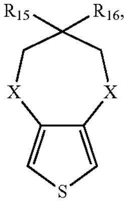
or
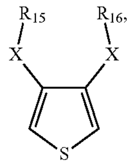
or

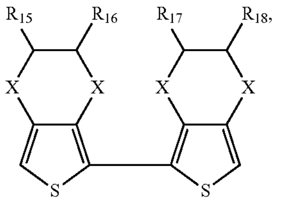
or

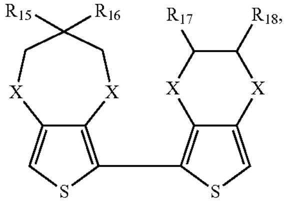
or

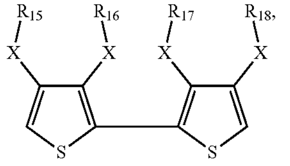
or

-continued

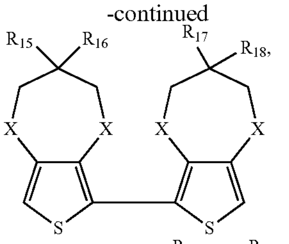
or

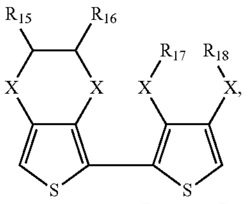
or
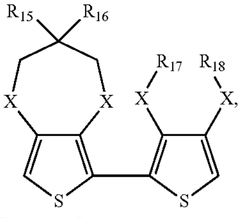
or

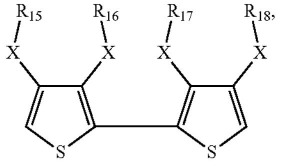
or

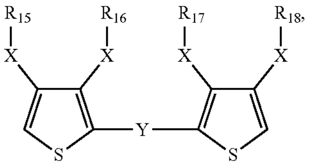
or

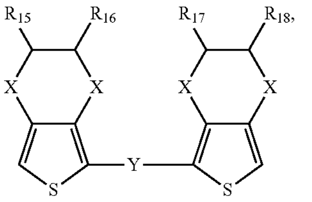
or

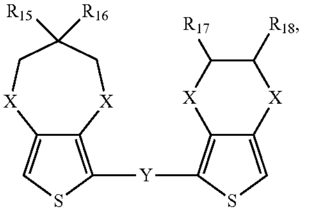
or

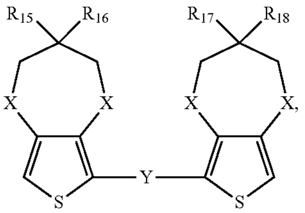
or

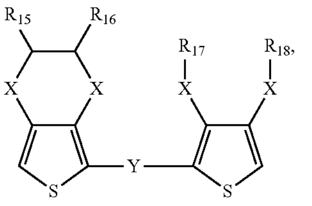
or

-continued

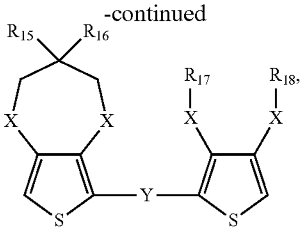

wherein X is S, Se, N, C, or O; each of $R_{15}$-$R_{18}$ is independently selected from one of hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ alkylthio, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl; Y is any one or more of Ars, or aromatic structures, or fused aromatic structures, or a combinations thereof.

14. The electrochromic polymer of claim 13, wherein X in the thiophene-based unit is O.

15. The electrochromic polymer of claim 1, wherein the electrochromic polymer comprises a formula of

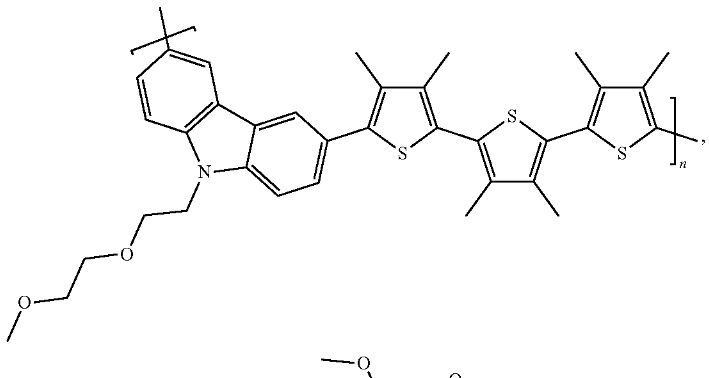

, or

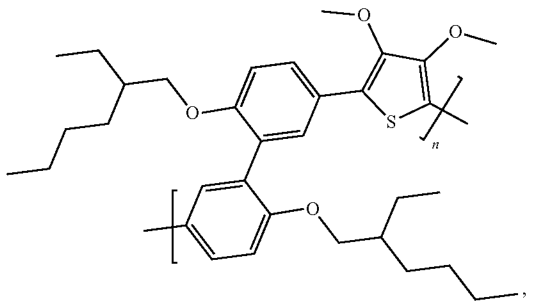

, or

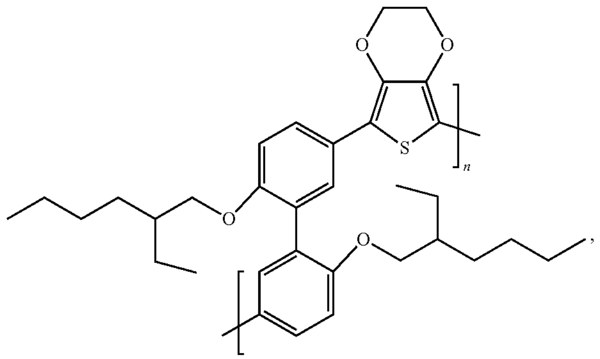

, or

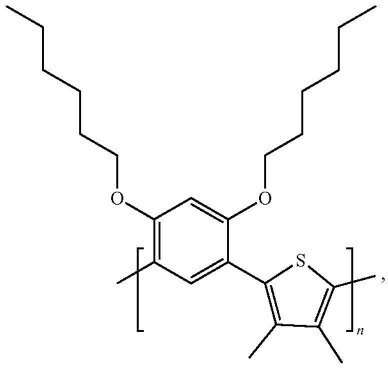

, or

-continued
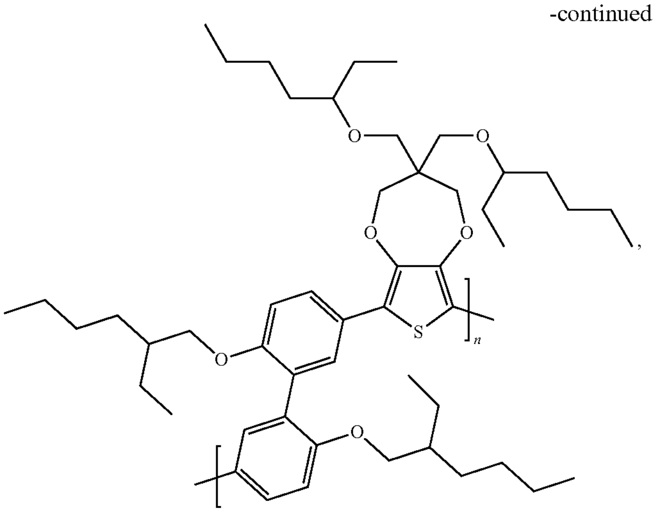
, or
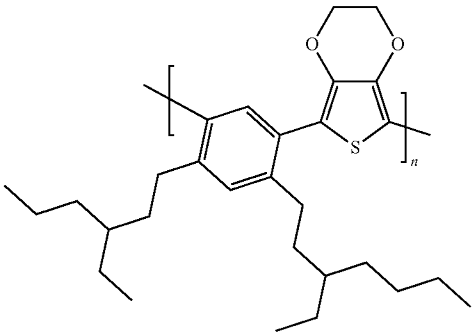
, or
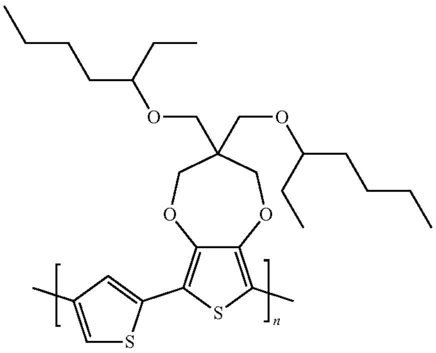
, or
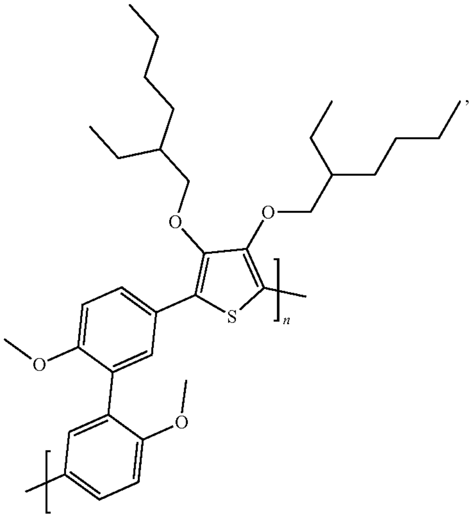
, or
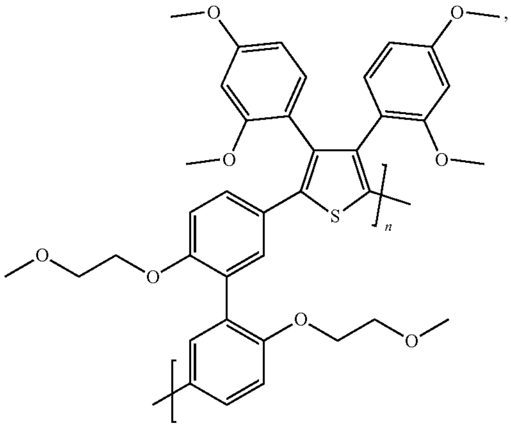
, or
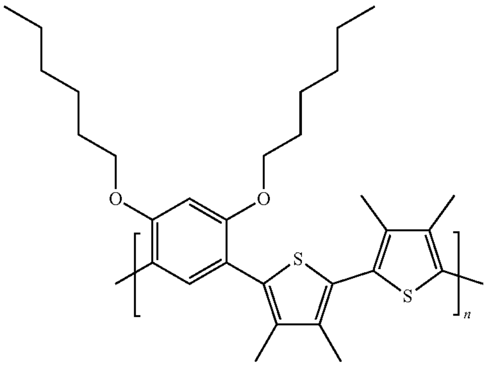
, or -continued
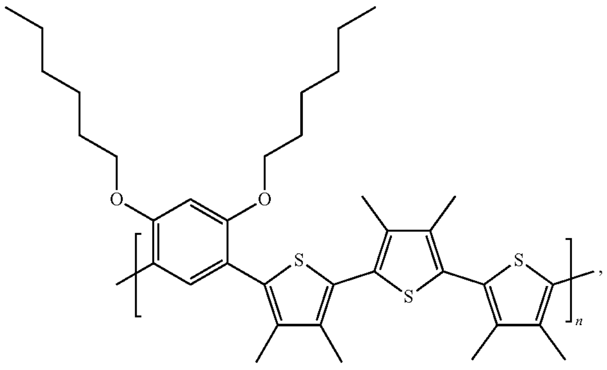
, or
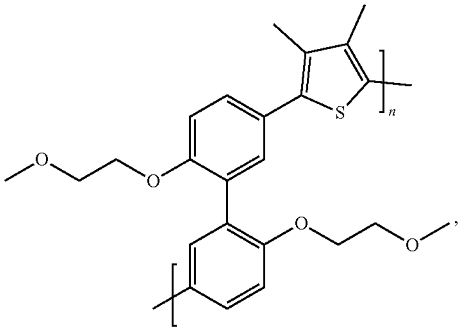
, or
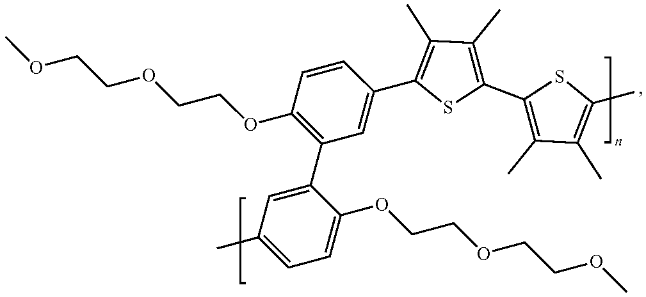
, or
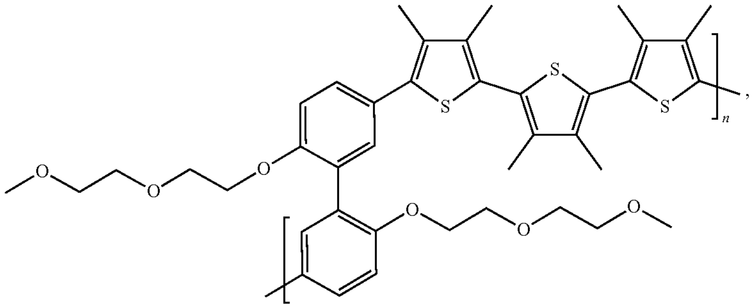
, or
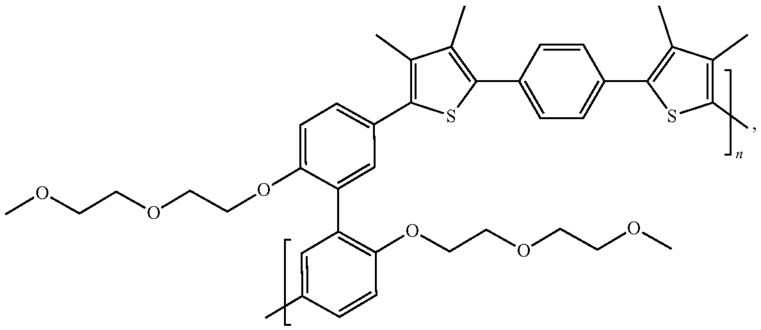
, or
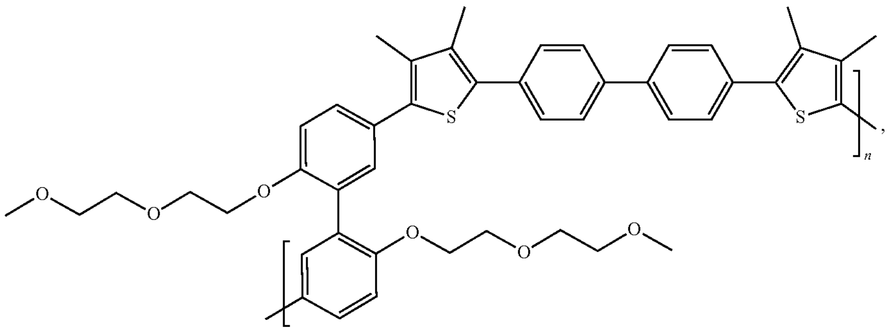
, or -continued
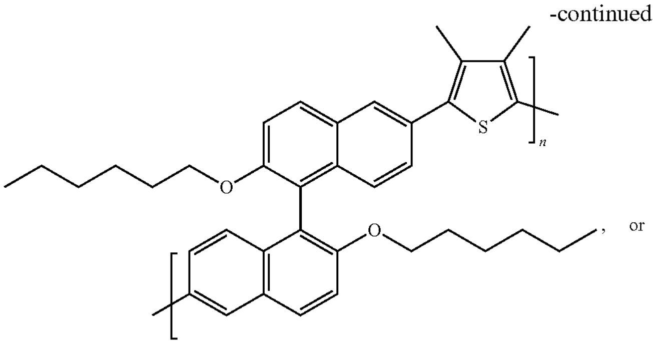
, or
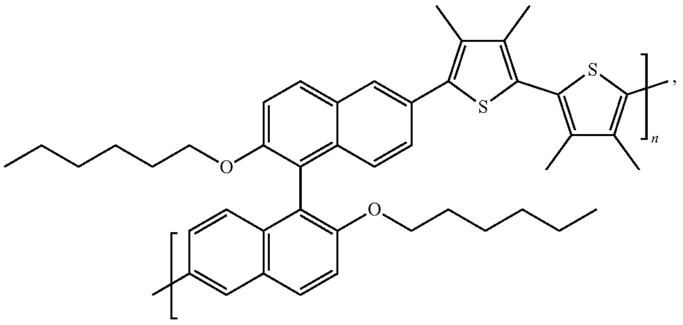
, or
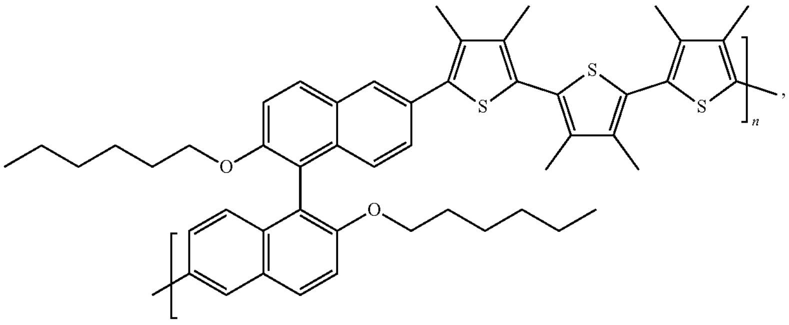
, or
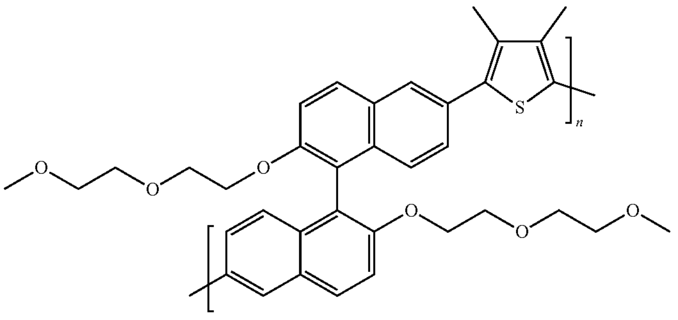
or
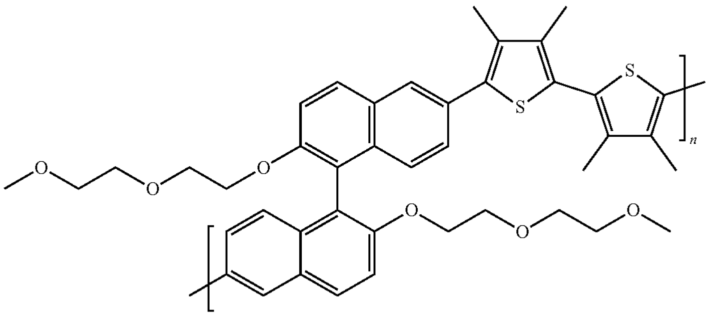
or -continued
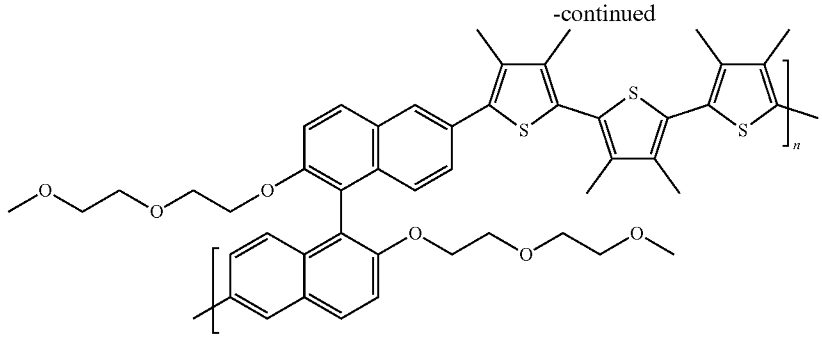
or
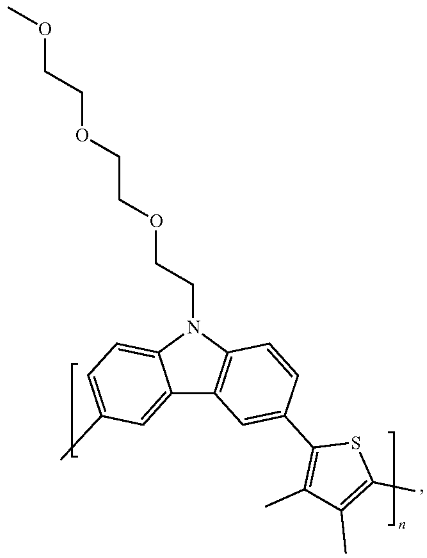
,
or
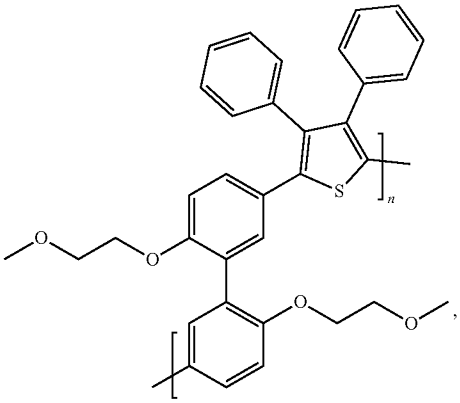
,
or
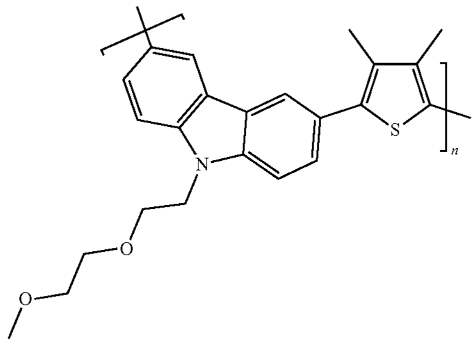
or
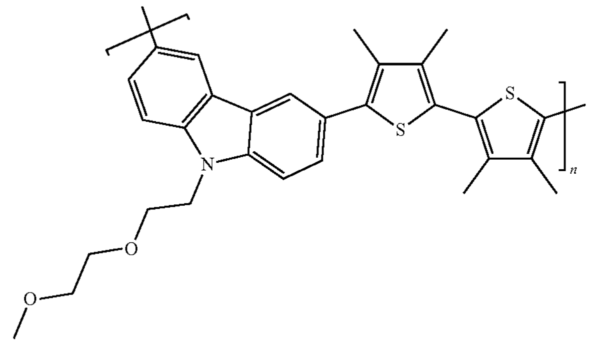
or -continued
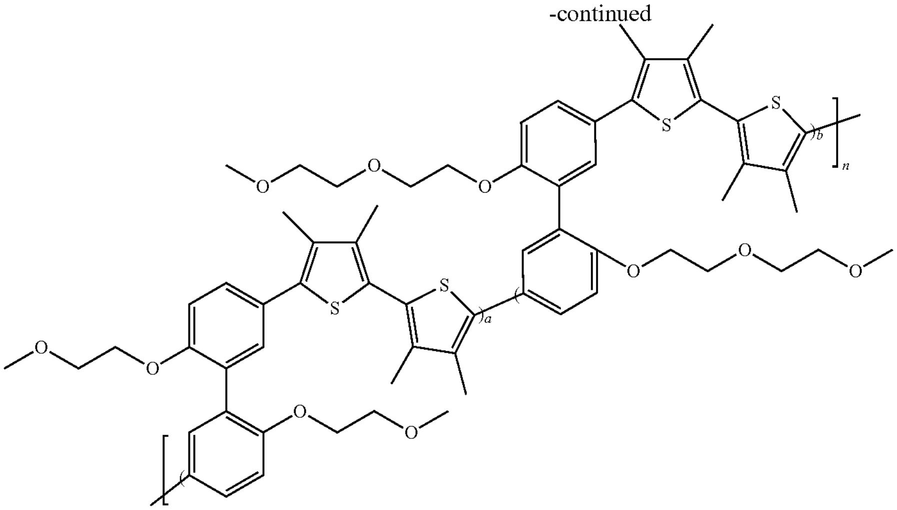
wherein n and m are integers greater than 0, a and b are integers equal to or greater than 0 with at least one of a and b is greater than 0.
* * * * *